US008049183B1

(12) United States Patent
Aubry et al.

(10) Patent No.: US 8,049,183 B1
(45) Date of Patent: Nov. 1, 2011

(54) APPARATUSES AND METHODS FOR CONTROL AND SELF-ASSEMBLY OF PARTICLES INTO ADAPTABLE MONOLAYERS

(75) Inventors: Nadine N. Aubry, Pittsburgh, PA (US); Pushpendra Singh, Pine Brook, NJ (US); Sai Nudurupati, Kearny, NJ (US); Muhammad Mansoor Janjua, Sault Ste Marie, MI (US)

(73) Assignee: Carnegie Mellon University, Pittsburgh, PA (US)

( * ) Notice: Subject to any disclaimer, the term of this patent is extended or adjusted under 35 U.S.C. 154(b) by 280 days.

(21) Appl. No.: 12/267,332

(22) Filed: Nov. 7, 2008

Related U.S. Application Data

(60) Provisional application No. 61/002,482, filed on Nov. 9, 2007.

(51) Int. Cl.
*G01N 21/01* (2006.01)
(52) U.S. Cl. ............................ 250/428; 345/60; 359/665
(58) Field of Classification Search .................... 250/428
See application file for complete search history.

(56) References Cited

U.S. PATENT DOCUMENTS

| | | | | |
|---|---|---|---|---|
| 4,079,368 | A * | 3/1978 | DiStefano | 345/60 |
| 6,507,989 | B1 | 1/2003 | Bowden et al. | |
| 6,518,168 | B1 | 2/2003 | Clem et al. | |
| 6,613,525 | B2 * | 9/2003 | Nelson et al. | 435/6 |
| 6,989,324 | B2 | 1/2006 | Lee et al. | |
| 7,007,370 | B2 | 3/2006 | Gracias et al. | |
| 7,052,616 | B2 | 5/2006 | Fonash et al. | |
| 7,060,224 | B2 | 6/2006 | Edman et al. | |
| 7,251,882 | B2 | 8/2007 | Ricks et al. | |
| 7,390,388 | B2 * | 6/2008 | Childers et al. | 204/547 |
| 7,724,444 | B2 * | 5/2010 | Kuiper et al. | 359/666 |
| 2006/0138392 | A1 | 6/2006 | Bowden et al. | |
| 2006/0154466 | A1 | 7/2006 | Lee et al. | |

OTHER PUBLICATIONS

Balzani, V. et al., "Molecular Devices and Machines—A Journey into the Nano World", Wiley-Vch, 2003, pp. 1-18.
Jones, Thomas B., "Electromechanics of Particles", Cambridge University Press, 1995, pp. 181-188.
Nicolson, M. M., "The Interaction Between Floating Particles", Proc. Cambridge Philosophical Soc., 45, 288-295 (1949).
Pohl, Herbert A.,"Dielectrophoresis: The behavior of neutral matter in nonuniform electric fields", Cambridge University Press, 1978, pp. 38-47.
Smythe, William R., "Static and Dynamic Electricity", 3rd Ed, McGraw-Hill Book Company, 1968, pp. 5-7.
Chan, D. Y. C., et al., "The Interaction of Colloidal Particles Collected at Fluid Interfaces, J. of Colloid and Interface Science", vol. 79, No. 2, Feb. 1981, pp. 410-418.
Gifford, W. A., et al., "On the Attraction of Floating Particles", Chemical Engineering Science, vol. 26, 1971, pp. 287-297.

(Continued)

*Primary Examiner* — Phillip A Johnston
(74) *Attorney, Agent, or Firm* — The Webb Law Firm

(57) ABSTRACT

Apparatuses and methods for the control and self-assembly of particles into adaptable monolayers and changing the relative position of a plurality of particles at an interface between two fluids, including applying an electric field perpendicular to the interface; moving the particles vertically in the interface in response to applying the electric field; moving the particles laterally within the interface in response to the electric field and capillary forces; maintaining the particles at the interface when moving the particles vertically; and maintaining the particles at the interface when moving the particles laterally.

25 Claims, 32 Drawing Sheets

OTHER PUBLICATIONS

Lucassen, Jacob, "Capillary Forces Between Solid Particles in Fluid Interfaces", Elsevier Science Publishers B.V., Celloids and Surfaces, 65, 1992, pp. 131-137.

Kralchevsky, P. A., et al., "Energetical and Force Approaches to the Capillary Interactions Between Particles Attached to a Liquid-Fluid Interface", Journal of Colloid and Interface Science, 155 (1993), pp, 420-437.

Aubry, Nadine, et al., "Physics Underlying Controlled Self-Assembly of Micro- and Nanoparticles of a Two-Fluid Interface Using an Electric Field", Physical Review, E. 77, 2008, pp. 056302-1-056302-11.

Aubry, N., et al., "Micro- and Nanoparticles Self-Assembly for Virtually Defect-Free, Adjustable Monolayers", PNAS, vol. 105, No. 10, Mar. 11, 2008, pp. 3711-3714.

Aveyard, R., et al., "Measurement of Long-Range Repulsive Forces Between Charged Particles at an Oil-Water Interface", Physical Review Letters, vol. 88, No. 24, Jun. 17, 2002, pp. 246102-1-246102-4.

Danov, Krassimir D., et al., "Electric Forces Induced by a Charged Colloid Particle Attached to the Water-Nonpolar Fluid Interface", Journal of Colloid and Interface Science, 298, 2006, pp. 213-231.

Foret, Lionel, et al., "Electric-Field Induced Capillary Interaction of Charged Particles at a Polar Interface, Physical Review Letters", vol. 92, No. 5, Feb. 6, 2004, pp. 058302-1-058302-4.

Fortes, M. A., "Attraction and Repulsion of Floating Particles", Can. J. Chem., vol. 60, 1982, pp. 2889-2895.

Gust, Dennis, et al., "Mimicking Photosynthetic Solar Energy Transduction", Acc. Chem. Res., 2001, vol. 34, pp. 40-48.

Klingenberg, D. J., et al., "Dynamic Simulation of Electrorheological Suspensions", J. Chem. Phys. 91 (12), Dec. 15, 1989, pp. 7888-7895.

Murray, C. B., et al., "Synthesis and Characterization of Monodisperse Nanocrystals and Close-Packed Nanocrystal Assemblies", Ann. Rev. Mater. Sci., vol. 30, 2000, pp. 545-610.

Stamou, Dimitris, et al., "Long-Range Attraction Between Colloidal Spheres at the Air-Water Interface: The Consequence of an Irregular Meniscus", Physical Review E, vol. 62, No. 4, Oct. 2000, pp. 5263-5272.

Nikolaides, M.G., et al., "Electric-field-induced capillary attraction between like-charged particles at liquid interfaces", Nature, vol. 420, Nov. 21, 2002, pp. 299-301. www.nature.com/nature.

Mugele, Frieder, et al., "Electrowetting: from basics to applications", J. Phys. Condens. Matter, 17, (2005), pp. R705-R774.

Bowden, Ned, et al., "Mesoscale Self-Assembly of Hexagonal Plates Using Lateral Capillary Forces: Synthesis Using the "Capillary Bond"", J. Am. Chem. Soc. 1999, 121, pp. 5373-5391.

Kadaksham, John, et al., "Dielectrophoresis induced clustering regimes of viable yeast cells", Electrophoresis 2005, 26, pp. 3738-3744.

Kadaksham, Arun, T.J., et al., "Dielectrophoresis of nanoparticles", Electrophoresis 2004, 25, pp. 3625-3632.

Kadaksham, J., et al., "Dynamics of Electrorheological Suspensions Subjected to Spatially Nonuniform Electric Fields", Journal of Fluids Engineering, Transactions of the ASME, 126, (2004), pp. 170-179.

Wasielewski, Michael R., "Photoinduced Electron Transfer in Supramolecular Systems for Artificial Photosynthesis", Am. Chem. Soc., 1992, 92, pp. 435-461.

Tang, Zhiyong, et al., "Self-Assembly of CdTe Nanocrystals into Free-Floating Sheets", Science, vol. 314, Oct. 13, 2006, pp. 274-278. www.sciencemag.org.

Bowden, Ned, et al., "Self-Assembly of Mesoscale Objects into Ordered Two-Dimensional Arrays", Science, vol. 276, Apr. 11, 1997, pp. 233-235. www.sciencemag.org.

Grzybowski, Bartosz A., et al., "Modeling of Menisci and Capillary Forces from the Millimeter to the Micrometer Size Range", J. Phys. Chem. B, 2001, 105, pp. 404-412.

Singh, P., et al., "Fluid dynamics of floating particles", J. Fluid Mech. (2005), vol. 530, pp. 31-80.

Kadaksham, J., et al., "Manipulation of particles using dielectrophoresis", Science Direct, Mechanics Research Communications 33 (2006) pp. 108-122.

Aubry, N. et al., "Control of electrostatic particle-particle interactions in dielectrophoresis", Europhysics Lett. 74 (4), pp. 623-629 (2006) DO110:1209/epl/i2005-10569-0.

Aubry, N. et al., "Electrostatic forces on particles floating within the interface between two immiscible fluids", Proceedings of IMECE2007, 2007 ASME International Mechanical Engineering Congress and Exposition, Nov. 11-15, 2007, Seattle, Washington USA, pp. 1-8.

Kralchevsky, P.A. et al., "Capillary interactions between particles bound to interfaces, liquid films and biomembranes", Advances in Colloid and Interface Science 85, pp. 145-192 (2000).

* cited by examiner

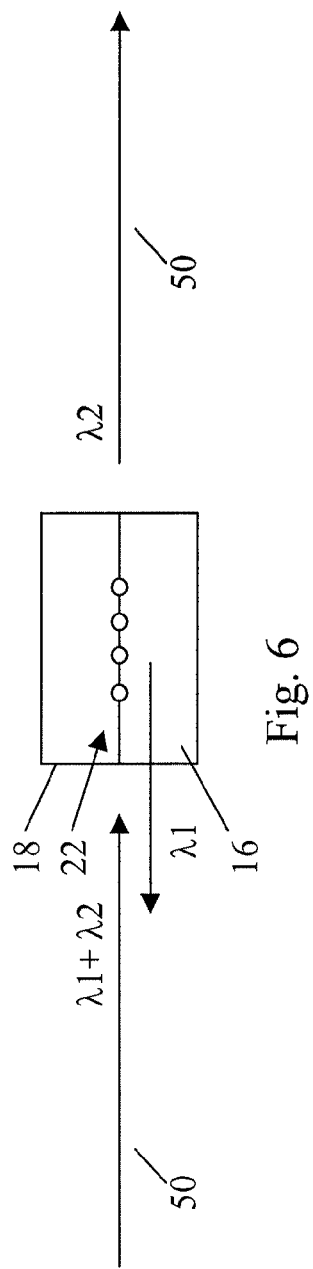
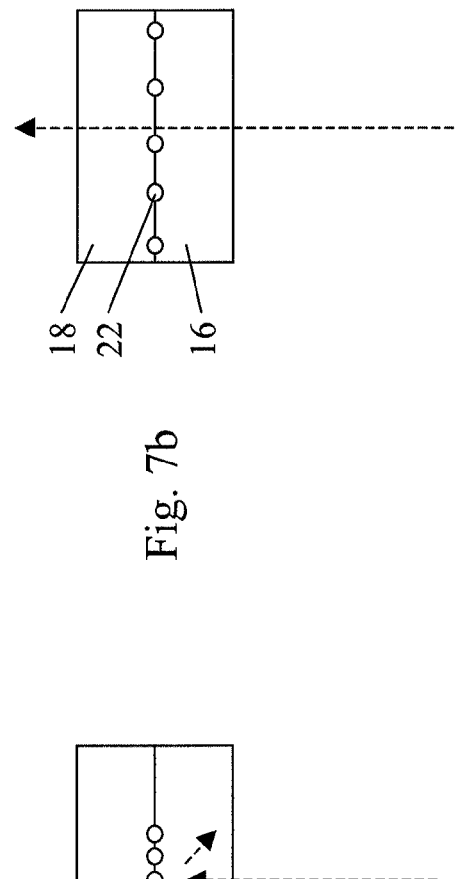
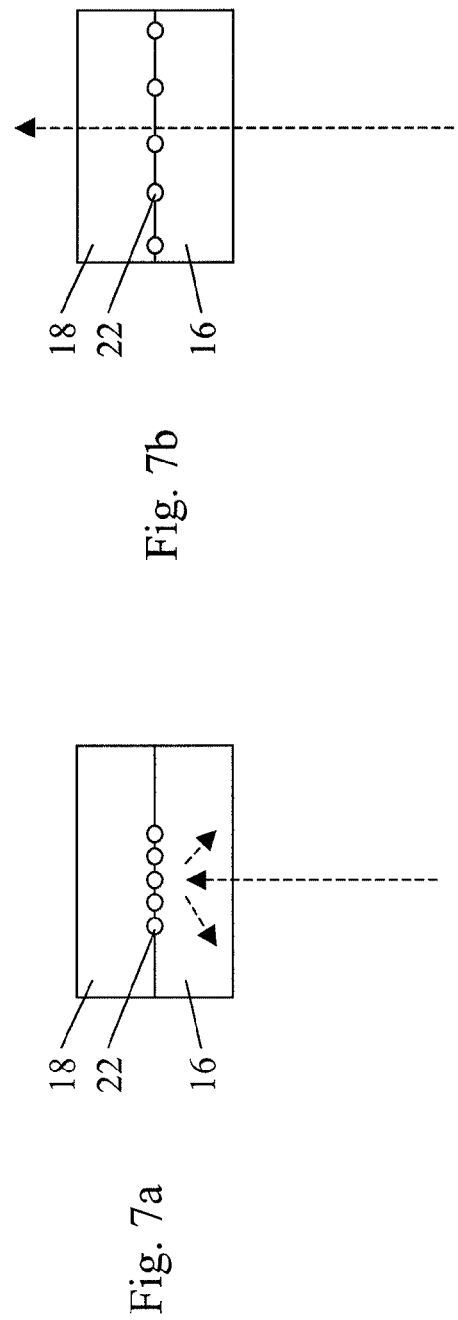

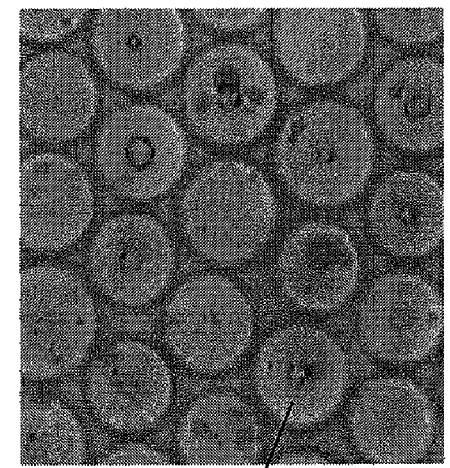
(b)
22
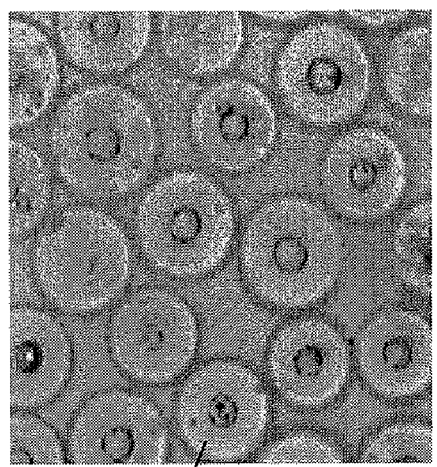
(a)
22
Fig. 9

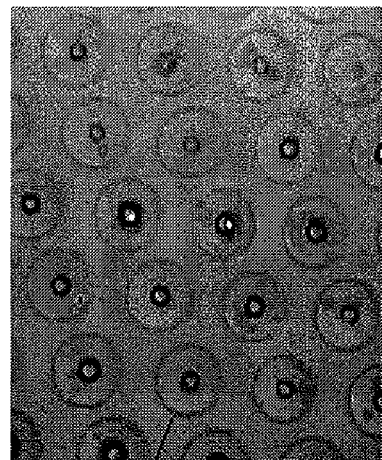
5000 volts
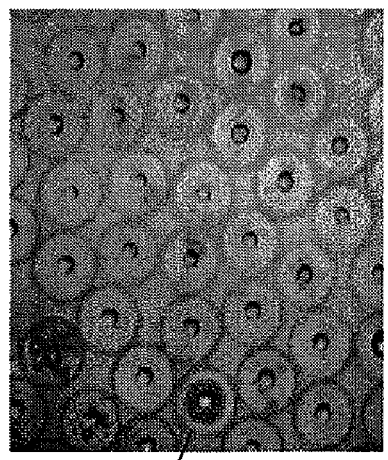
0 volts
Fig. 10

APPARATUSES AND METHODS FOR CONTROL AND SELF-ASSEMBLY OF PARTICLES INTO ADAPTABLE MONOLAYERS

CROSS-REFERENCE TO RELATED APPLICATIONS

This application claims priority from U.S. Provisional patent application Ser. No. 61/002,482, filed Nov. 9, 2007, and which is incorporated by reference herein

FIELD OF THE INVENTION

This invention relates to apparatuses and methods for control and self-assembly of particles into adaptable monolayers.

BACKGROUND OF THE INVENTION

Particles floating at an interface, in general, self-assemble or cluster because they deform the interface, thus giving rise to lateral capillary forces which cause the particles to cluster. For example, cereal flakes floating on the surface of milk cluster by this mechanism. The attractive lateral capillary forces arise due to the fact that for two floating particles, the deformed interface is such that the interface height between the particles is lowered due to the interfacial tension. See, for example, M. A. Fortes, "Attraction and repulsion of floating particles", *Can. J. Chem.* 60, 2889 (1982); W. A. Gifford and L. E. Scriven, "On the attraction of floating particles", *Chem. Engrg. Sci.* 26, 287-297 (1971); Kralchevsky, P. A., V. N. Paunov, N. D. Denkov, I. B. Ivanov and K. Nagayama. "Energetical and force approaches to the capillary interactions between particles attached to a liquid-fluid interface", *J. Colloid and Interface Sci.* 155, 420-437 (1993), J. Lucassen, "Capillary forces between solid particles in fluid interfaces", *Colloids Surf* 65, 131-137 (1992); and P. Singh and D. D. Joseph, "Fluid dynamics of Floating particles", *J. Fluid Mech.* 530, 31-80 (2005). The lateral component of the capillary force acting on the particles is attractive and causes them to move towards each other.

This naturally occurring phenomenon, however, produces monolayers that display many defects, lack order (both short and long ranged) and whose distance between the particles cannot be controlled. These are three drawbacks which seriously limit the range of applications one can target using this technique. In addition, such a phenomenon does not manifest itself on particles smaller than ~10 μm, which further limits the applications for this technique.

The vertical position of a floating particle within a two-fluid interface is such that the total force acting on it in the direction normal to the interface is zero, and this position determines the extent of interfacial deformation and lateral capillary forces. A particle that is denser than the liquid below can float on its surface because the vertical component of capillary force, which arises due to the deformation of the interface, balances the particle's buoyant weight.

As mentioned above, such a phenomenon does not manifest itself on particles smaller than ~10 μm. In particular, for a small particle of radius a, the buoyant weight, which scales as $a^3$, becomes negligible compared to the capillary force, which scales as a, and therefore insignificant interfacial deformation is needed for balancing the buoyant weight of small particles. Consequently, the lateral capillary forces due to the deformation of the interface are too small to move micron and submicron sized particles, and thus, small particles, in general, do not self-assemble under the action of capillary forces alone. However, small particles can self-assemble if they are charged or if they have irregular contact lines.

Many envisioned applications of nanotechnology and fabrication of mesoscopic objects strongly rely on the manufacturing of such micro- and nano-structured materials. Future progress in this area will critically depend upon our ability to accurately control the particles arrangement (e.g., lattice spacing, defect-free capability and long range order) in three dimensions (3D) as well as in two dimensions (2D) for a broad range of particle sizes, shapes, and types.

Accordingly, there is a need for improved methods and systems for the fabrication of self-assembled, defect-free adjustable monolayers of particles. Those and other advantages of the present invention will be described in more detail hereinbelow.

SUMMARY OF THE INVENTION

The present invention provides methods for the self-assembly of adaptable monolayers of particles. The present invention is applicable to a broad range of particle sizes and types, including nano-particles and electrically neutral particles. Importantly, the methods of the present invention are capable of controlling the lattice spacing statically or dynamically, forming virtually defect-free monolayers. The methods utilize the application of an electric field perpendicular to the interface, or having a component perpendicular to the interface, on which particles are floating which allows the manipulation of the clustering of particles floating at an interface. The method is capable not only of expanding an already assembled monolayer, but also of increasing its level of order and of tuning the lattice spacing.

Such a control in 2D will lead to the manufacture of controlled particle monolayers or ultra-fine porous membranes with adjustable, but regular (in the case of uniform particles and uniform electric field), pore sizes, and therefore with adaptable mechanical, thermal, electrical and/or optical properties. Applications of such materials includes, but is not limited to controlled nanofluidic drug delivery patches with adjustable mass transfer properties across the patch; nanoporous membranes and nanofilters, e.g., for separation of proteins based on their sizes; solid monolayers and fluid/fluid interfaces with dynamically adjustable properties (heat, mass, optical and electrical properties); antireflection coatings (ARCs), e.g., to improve the efficiency of solar cells; photonic materials for optical circuits and electronic nano-circuits with improved performance in absence of defects.

In one embodiment, the present invention is a method of changing the relative position of a plurality of particles at an interface between two fluids. The method includes applying an electric field perpendicular, or having a component perpendicular, to the interface, moving the particles vertically in the interface in response to applying the electric field, moving the particles laterally within the interface in response to the electric field and in response to capillary forces, maintaining the particles at the interface when moving the particles vertically, and maintaining the particles at the interface when moving the particles laterally.

In another embodiment, the present invention is a method of orienting a plurality of particles in a monolayer array, wherein the plurality of particles are located at an interface between two fluids. The method includes increasing (or decreasing) the intensity of an electric field perpendicular to the interface; increasing a distance between the plurality of particles in response to increasing (or decreasing) the electric field perpendicular to the interface; maintaining the increased distance between the plurality of particles; allowing the plurality of particles to change their order and orientation after increasing the distance between the plurality of particles; reducing (or increasing) the intensity of the electric field perpendicular to the interface; and decreasing the distance between the plurality of particles in response to decreasing (or increasing) the intensity of the electric field perpendicular to the interface.

In another embodiment the present invention is an apparatus including: a container; first and second electrodes located on opposite sides of the container; a voltage source having an input, having an output connected to the first electrode, and having an output connected to the second electrode; a sensor oriented to sense a characteristic of particles at an interface between two fluids in the container; a processor connected to an output of the input device and connected to an input of the voltage source; and a memory connected to the processor. The memory includes computer-readable instructions which, when executed by the processor, cause the processor to perform the steps of: determining a characteristic of the particles at the interface via the input device; determining whether the characteristic sensed satisfies a predetermined condition; sending control signals to the voltage source to apply an electric field perpendicular to the interface if the characteristic of the particles at the interface do not meet the predetermined condition; moving the particles vertically in the interface in response to the electric field; moving the particles laterally within the interface in response to the electric field and in response to capillary forces; and maintaining the particles at the interface when moving the particles vertically and when moving the particles laterally.

Many variations are possible with the present invention, some of which will be described in the following detailed description of the invention.

BRIEF DESCRIPTION OF THE DRAWINGS

Embodiments of the present invention will now be described, by way of example only, with reference to the accompanying drawings for the purpose of illustrating the embodiments, and not for purposes of limiting the invention, wherein:

FIG. 6 illustrates another embodiment of the apparatus of the present invention.

FIG. 7 illustrates another embodiment of the apparatus according to the present invention.

FIG. 9 illustrates another embodiment of the operation of the present invention in the form of re-ordering particles into a more ordered array.

FIG. 10 illustrates another embodiment of the operation of the present invention in the form of re-ordering particles into a more ordered array.

FIG. 15 illustrates the vertical electrostatic force computed numerically and plotted as a function of the particle radius a.

FIG. 20 illustrates the dimensionless equilibrium separation between two particles as a function of E for three values of the particle radius a.

DETAILED DESCRIPTION OF THE INVENTION

The present invention applies generally to the controlled self-assembly of millimeter to nano sized particles at a two-fluid interface using an electric field. Under certain conditions, an externally applied electric field can be used to control the spacing and movement of particles floating at a two-fluid interface. The present invention has many applications, such as to assemble a virtually defect free monolayer whose lattice spacing can be adjusted by varying the electric field strength. Although the invention works when both the electrical permittivity and conductivity of the particles are non-zero, the physics underlying the present invention will be described in the case where both fluids and particles are perfect dielectrics and for this case the (capillary and electrical) forces acting on the particles will be analyzed, an expression for the lattice spacing under equilibrium condition will be deduced, and the dependence of the latter upon the various parameters of the system, including the particles' radius, the dielectric properties of the fluids and particles, the particles' position within the interface, the particles' buoyant weight and the applied voltage will be studied. While for relatively large sized particles whose buoyant weight is much larger than the vertical electrostatic force, the equilibrium distance increases with increasing electric field, for submicron sized particles whose buoyant weight is negligible, it decreases with increasing electric field. For intermediate sized particles, the distance first increases and then decreases with increasing electric field strength.

Figure 1:
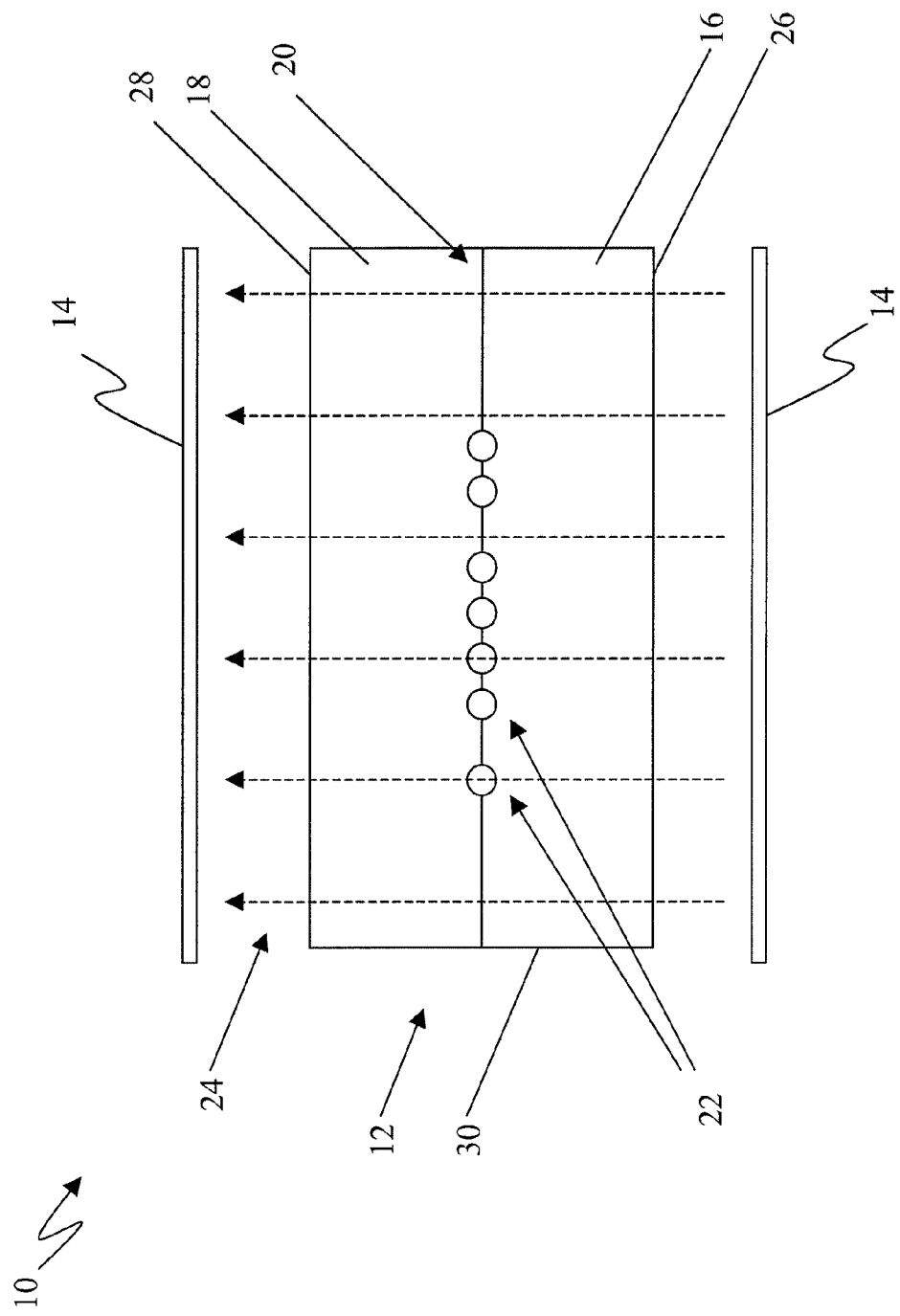
FIG. 1 illustrates one embodiment of an apparatus according to the present invention.

FIG. 1 illustrates an apparatus 10 according to one embodiment of the present invention. The apparatus 10 includes a container 12 and two electrodes 14.

The container 12 is used to hold first and second fluids 16, 18. The fluids 16, 18 may have the same dielectric constant, or they may have different dielectric constants. The fluids 16, 18 may be one liquid and one gas, or two liquids. The fluids 16, 18 form an interface 20 between the fluids 16, 18, and the interface 20 may include particles 22. The container may have a bottom surface 26, a top surface 28, and side surfaces 30. The container 12 may also have shapes that do not include all of those surfaces, such as an open top container 12, or a spherical container 12, or other shapes.

The fluids 16, 18 will generally be described as layers of fluids, with one layer 18 on top of another 16. As will be described in more detail herein, more than two fluids or fluid layers may be used with the present invention. In some embodiments, the term "film" is used for a relatively thin layer of fluid. However, the particular terms used in connection with the fluids are not intended to limit the present invention, and many variations (and thickness) of the fluids are possible with the present invention. These fluids 16, 18 (or fluid layers) will generally be described in terms of the lower fluid 16 having a depth that is greater than the diameter of the particles 22. However, in some embodiments of the present invention the lower fluid 16 may be relatively shallow (e.g., less than the diameter of the particles 22) so that the particles 22 (or some but not all of the particles 22 if the particles 22 have different characteristics) are in contact with the bottom surface 26 of the container 12. This embodiment may be used, for example, to manipulate the particles 22 to produce films and coatings. Similarly, in other embodiments of the present invention, the upper fluid 18 may be relatively shallow (e.g., less than the diameter of the particles 22) so that the particles (or some but not all of the particles 22 if the particles 22 have different characteristics) are in contact with the top surface 28 of the container 12.

The interface 20 is formed between the fluids 16, 18. The interface 20 may be formed by the two fluids 16, 18 contacting each other directly, or the interface 20 may include one or more additional fluids between the fluids 16, 18, such as one or more films. For example, the interface 20 may include a film whose thickness in the direction normal to the interface 20 is smaller than the particles' 22 diameter. Other fluid films with different thicknesses may also be used with the present invention. The interface 20 will sometimes be described as being planar, which is true in a general sense as well as initially before the particles are introduced on the interface 20. However, the interface 20 is deformed around the particles 22 as described in more detail herein. In other embodiments, the electric field 24 may be used to deform the shape of the interface 20 so that it is curved or otherwise non-planar.

The particles 22 are located at the interface 20 between the fluids 16, 18 and form a two-dimensional array of particles 22 at the interface 20. The particles 22 and the fluids 16, 18 are typically selected as those which will move within the two-dimensional plane of the interface 20 but resist moving out of the interface 20 and into the bulk fluids 16, 18. The particles may be of many different materials, shapes, and sizes. For example, the present invention will generally be described in terms of particles 22 being glass beads, although materials other than glass and shapes other than spheres may be used with the present invention.

The particles 22 will generally be described as being all the same, although this is not required for the present invention. For example, the particles 22 may have different sizes, different dielectric properties, different wettabilities, different properties with regard to the fluids 16, 18, and other variations. These differences between the particles 22 can be used, for example, to provide for different particle 22 spacing, different orientations and arrangements of the particles 22, and other variations according to the present invention. The particles 22 will generally have homogeneous physical, electrostatic, optical, etc. properties either internally or on their surface, although this is not required for the present invention. For example, the particles 22 could have two or more faces (like the so-called Janus particles) or particles with internal inhomogeneities like particles with a core, a membrane, etc.).

The electrodes 14 are used to apply an electric field 24 across the interface 20 and affect the particles 22. In particular, the present invention can use the electric field 24 to change the vertical position of the particles 22 relative to the interface 20. The electric field 24 also gives rise to the repulsive electrostatic forces between the particles 22. By doing so, the present invention can control the lateral capillary and electrostatic forces acting on the particles and, thereby, control the lateral movement and lateral spacing of the particles 22 in the interface 20.

The electrodes 14 will generally be described in terms of applying a uniform electric field 24 across the interface 20. However, the electrodes 14 may also be used to apply a non-uniform electric field 24 across the interface 20. For example, the electric field 24 may increase or decrease at different parts of the interface 20, and the variations may be gradual or they may be sudden. The creation of a non-uniform electric field 24 may be accomplished, for example, through the use of more than two electrodes 14 or through the particular operation of the electrodes 14. The non-uniform electric fields 24 can be used, for example, to provide for non-uniform spacing of particles 22 at the interface 20.

The electrodes 14 will generally be described in terms of applying an electric field 24 perpendicular to the interface 20. This may be accomplished, for example, by applying the electric field 24 exactly perpendicular to the interface 20. However, a perfectly perpendicular electric field 24 is not required with the present invention. On the contrary, the present invention may apply the electric field 24 at orientations that are offset from perpendicular with respect to the interface 20. In such cases, there will be a component of electric field 24 that is perpendicular to the interface 20, and a component of the electric field 24 that is parallel to the interface 20. As a result, applying an electric field 24 perpendicular to the interface 20 may be accomplished with a perfectly perpendicular electric field 24 or with an electric field 24 that is not perfectly perpendicular.

The present invention may use a parallel component of the electric field 24 to control the particles 22. For example, if there is a parallel component to the electric field 24, it may be used to affect the lateral movement of the particles 22, so that the particles 22 may align along the parallel component of the electric field and thus form particle chains. In this case, the extent of the attractive forces between the particles 22 and the possibility of particle chains formation will depend on a number of factors, such as the strength of the parallel component of the electric field 24 and the properties of the particles 22. The perpendicular component of the electric field 24 is described in more detail herein.

The present invention will generally be described in terms of two fluids 16, 18, with one fluid located above the other and with a generally planar interface 20 between the fluids 16, 18. Terms such as "vertical", "lateral", "above", "below", "top", "bottom", and others are used in the context of that orientation. However, the present invention includes many variations and embodiments, and the present invention is not limited to the particular embodiments described herein.

Figure 2:
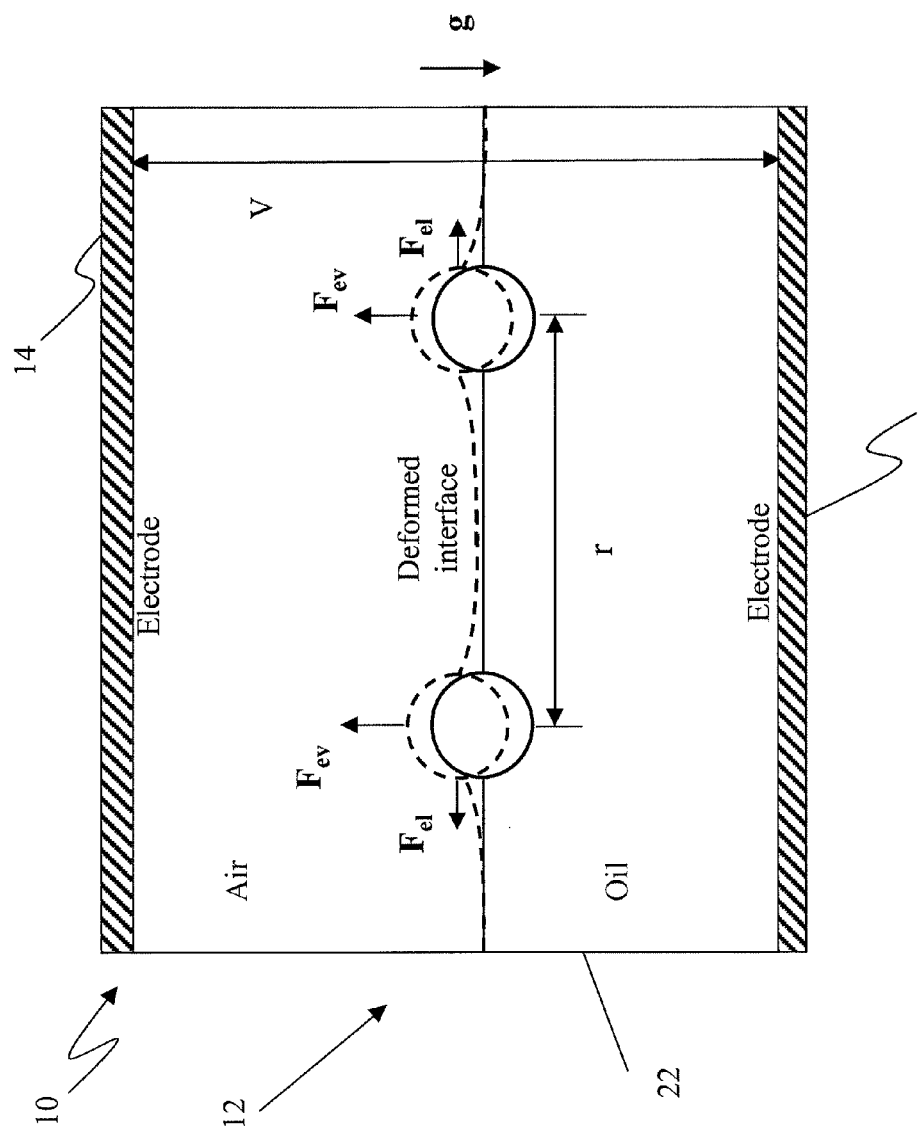
FIG. 2 illustrates another embodiment of the apparatus according to the present invention.

FIG. 2 illustrates another embodiment of an apparatus 10 according to the present invention. In that embodiment, the apparatus 10 has a square cross-section and, for example, is used to assemble particles 22 on the surface of corn oil 18. The distance between the electrodes 14 is 0.6 cm and the cross-sectional dimensions are 1.9×1.9 cm. The electric field 24 is generated by two electrodes 14 that are mounted at the top and bottom surfaces, and energized using AC voltage. The electrodes 14 may be insulated by placing a layer of non-conducting material between the fluid 16 and the electrode 14, and between the fluid 18 and the electrode 14. An AC electric field with a frequency of 100 Hz was used to ensure that the influence of conductivity was negligible. The electrostatic force acts on particles in both vertical ($F_{ev}$) and lateral ($F_{el}$) directions. The particles 22 also experience capillary forces which are not shown. The liquid 18 in the lower layer fills approximately one half of the container 12. The thickness of the lower fluid 18 layer is adjustable and can be such that the particles 22 touch the lower surface of the device.

The illustrated apparatus 10 was used to perform experiments with approximately mono-disperse glass particles 22 of radius between 2 μm and 77.5 μm. The density and dielectric constant of glass particles is 2.5 g/cm$^3$ and 6.5, respectively, and those of corn oil 18 are 0.92 g/cm$^3$ and 2.87. The conductivity of corn oil 18 is 32.0 pSm$^{-1}$ and the interfacial tension between air and corn oil is 33.5 dyne/cm. Any moisture particles may contain was removed by drying particles in an oven for more than 3 hours at the temperature of 120° C.

Figure 3:
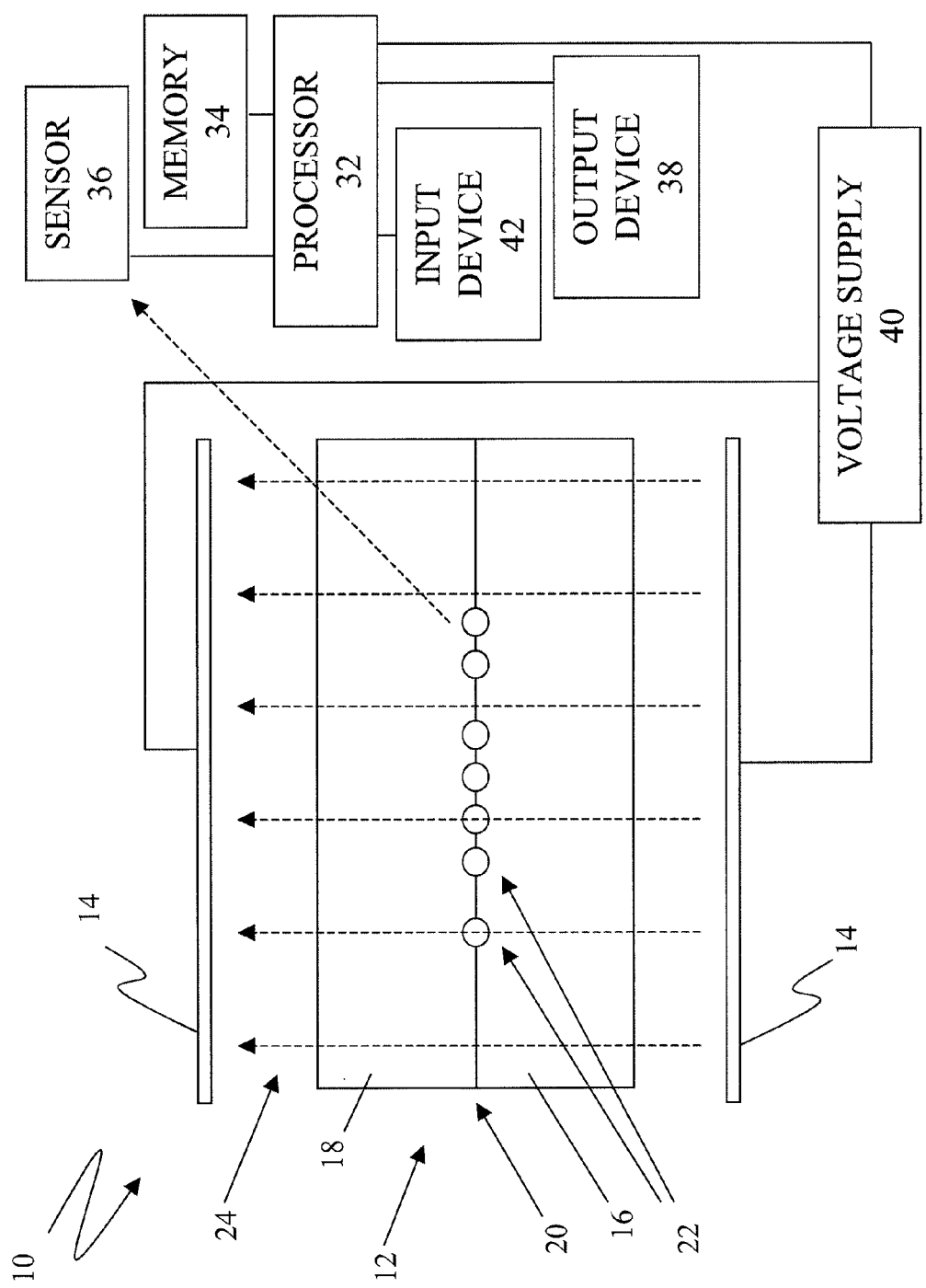
FIG. 3 illustrates another embodiment of the apparatus according to the present invention.

FIG. 3 illustrates another embodiment of the present invention. In that embodiment, the apparatus 10 includes a processor 32, memory 34, a sensor 36, an output or display device 38, a voltage supply 40, and an input device 42. The processor 32 is connected to the memory 34, the sensor 36, the output device 38, and the voltage supply 40. The memory 34 includes computer readable instructions, such as computer hardware, software, firmware, or other forms of computer-readable instructions which, when executed by the processor 32, cause the processor 32 to perform certain functions, as described herein.

The processor 32 receives input from the sensor 36, and provides control signals to the voltage supply 40. The processor 12 also performs certain functions, as described herein.

The memory 34 can be any form of computer-readable memory, and may store information in electrical form, magnetic form, optical form, or other forms. The memory 34 includes computer readable instructions which, when executed by the processor 32, cause the processor 32 to perform certain functions, as described herein. The memory 34 may be separate from the processor 32, or the memory 34 may be integrated with the processor 32. The memory 34 may also include more than one memory device, which may be integrated with the processor 32, separate from the processor 32, or both.

The sensor 36 may be a camera or other device for determining one or more parameters of the particles 22. For example, the sensor 36 may monitor the interface 20 at visible or invisible wavelengths and provide signals to the processor 32. The sensor 36 may be used, for example, to determine the spacing between particles 22, whether particles are moving apart or together, or other characteristics.

The output device 38 may be a video display or other forms of outputting information to a user.

The voltage source 40 receives control signals from the processor 32 and, in response thereto, controls the electric field 24 by controlling the voltage across the electrodes 14.

The input device 42 may be, for example, a keyboard, a touchscreen, a computer mouse, or other forms of inputting information from a user to the processor 32.

Many variations are possible with the system 10 according to the present invention. For example, more than one processor 32, memory 34, sensor 36, output device 38, voltage supply 40, and input device 42 may be present in the system 10. In addition, devices not shown in FIG. 3 may also be included in the system 10, and devices shown in FIG. 3 may be combined or integrated together into a single device, or omitted. For example, in some embodiments the voltage supply 40 may be controlled directly by a user, such as through the input device 42, and the processor 32, memory 34, and sensor 36 may be eliminated.

In one embodiment, the sensor 36 monitors particles 22 at the interface 20 and send signals to the processor 32 indicative of sensed characteristics of the particles 22 at the interface 20. The processor 32 receives the signals from the sensor 36, determines whether the particles 22 satisfy a desired condition, and sends to control signals to the voltage source 40 to adjust the electric field 24 and change the characteristics of the particles 22 and to perform certain tasks as described herein.

Figure 4:
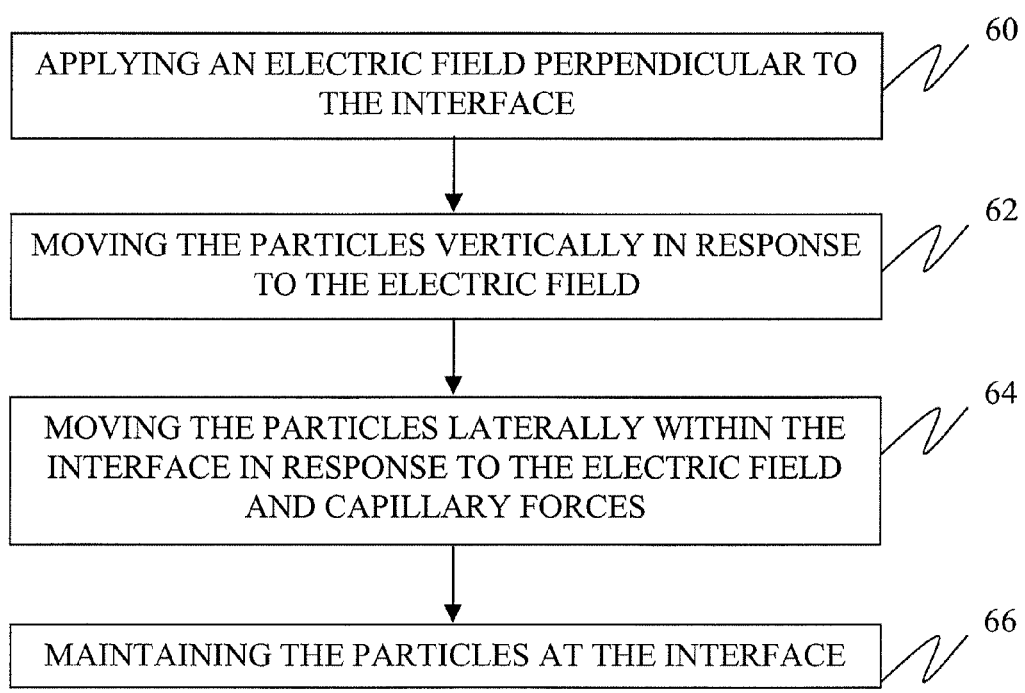
FIGS. 4 and 5 illustrate embodiments of the method according to the present invention.

FIG. 4 illustrates one embodiment of a method according to the present invention. That method is directed generally to controlling the lateral movement of particles 22 within the interface 20.

Step 60 includes applying an electric field 24 perpendicular to the interface 20.

Step 62 includes moving the particles 22 vertically in response to applying the electric field 24. As described in more detail herein, the application of the electric field 24 according to the present invention will, in general, cause the particles 22 to move vertically at the interface 20.

Step 64 includes moving the particles 22 laterally within the interface 20 in response to the electric field and capillary forces that act on the particles 22 because of the deformation of the interface 20. As described in more detail herein, moving the particles 22 vertically will change the interface 20 in the area around the particles 22, and this change will induce lateral capillary forces acting on the particles 22, thereby causing the particles 22 to move laterally in the interface 20. Also as described in more detail herein, the application of the electric field 24 polarizes the particles 22, which causes electrostatic particle-particle interactions, thereby causing the particles 22 to move apart.

Step 66 includes maintaining the particles 22 at the interface 20. As described in more detail herein, the particles 22 are caused to move both vertically (in general) and laterally according to the present invention, but the particles generally remain at the interface 20 and generally do not move into the bulk fluids 16, 18.

Many variations are possible with the present invention, and the method described herein may be varied and modified within the teachings of the present invention.

Figure 5:
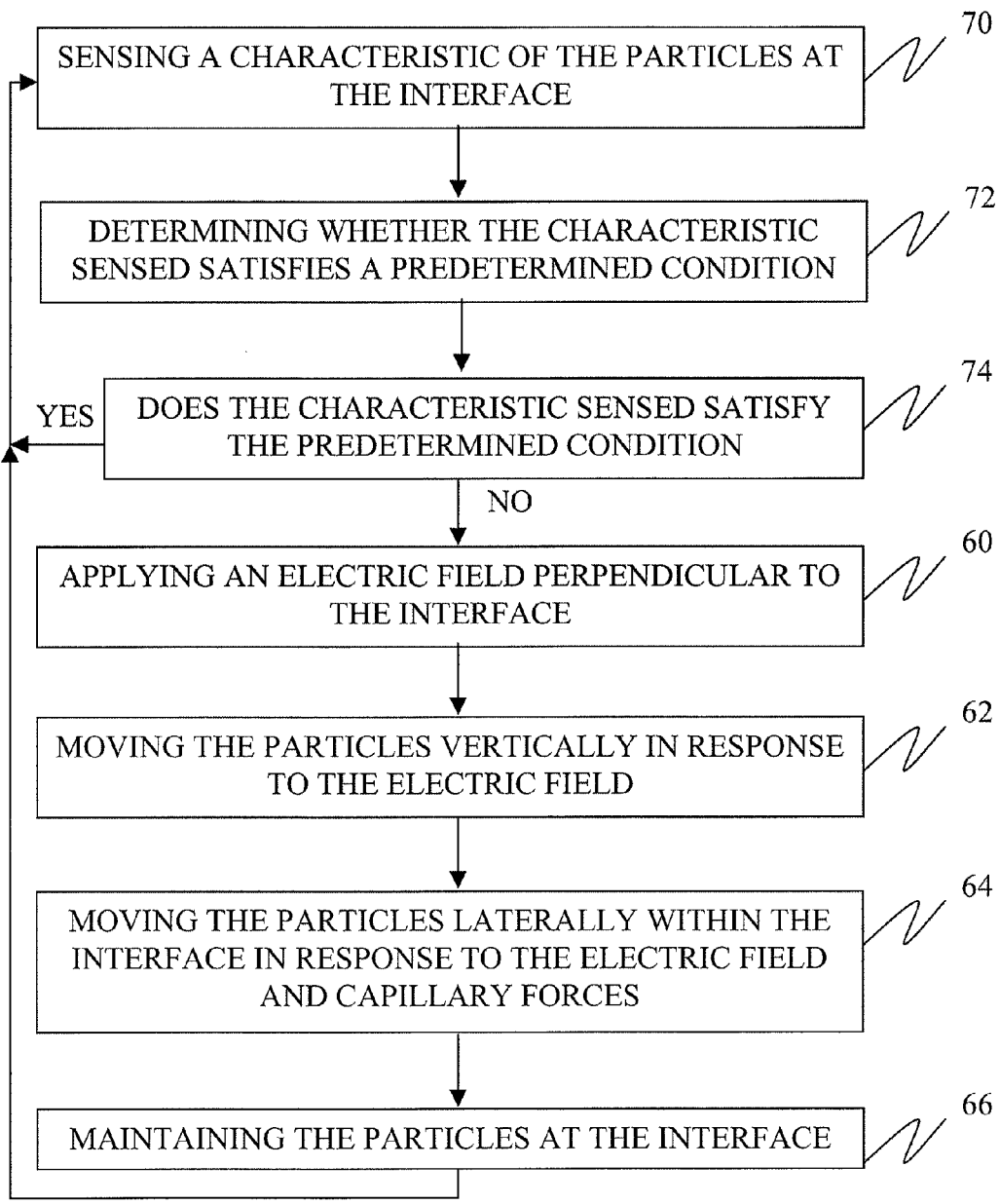

FIG. 5 illustrates another method according to the present invention. That method may be implemented, for example, with the apparatus illustrated in FIG. 3

Step 70 includes sensing a characteristic of the particles 22 at the interface 20. The sensing 70 may be accomplished with, for example, the sensor 36.

Step 72 includes determining whether the characteristic of the particles 22 that was sensed satisfies a predetermined condition. For example, with reference to FIG. 3, the processor 32 may process data from the sensor 36 and determine if the characteristics of the particles 22 satisfy a predetermined condition. That condition may be, for example, the spacing between the particles 22, the order and arrangement of the particles 22, the number of defects in the array of particles 22, or other conditions. The predetermined condition may, for example, be stored in the memory 34 and accessed by the processor 32.

Step 74 determines whether the characteristic sensed satisfies the predetermined condition. If it does, then the method returns to step 70. If the characteristic sensed does not satisfy the predetermined condition, then the method proceeds to step 60 where the electric field is applied. In other words, if it is determined that the particles 22 are not satisfactory without the application of the electric field, then steps 60, 62, 64, and 66 are also performed as described above. If, however, it is determined that the particles 22 are satisfactory without the application of the electric field, then the electric field is not applied and steps 60, 62, 64, and 66 are not performed.

The method illustrated in this figure may be repeated many times, and the characteristic of the particles that is sensed in step 70 may change over time, the predetermined condition in step 72 may also change, and other parts of the method may change.

For example, the method may begin by sensing 70 the degree to which the particles are ordered and/or the number of defects in the array of particles 22. If it is determined that the particles 22 are not satisfactory, then the electric field may be applied in step 60 so that the particles 22 begin to move apart from each other.

The next time step 70 is performed, the characteristics of the particles 22 that is sensed may be the distance between the particles 22, and the electric field may be increased until that distance meets a predetermined condition or distance.

The next time step 70 is performed, the characteristic that is sensed may again be the degree to which the particles 22 are ordered and/or the number of defects, and the electric field may be maintained until the particles 22 rearrange themselves to meet the predetermined condition while being spaced apart by the predetermined distance.

The next time step 70 is performed, the predetermined condition may be the distance between the particles 22 and the electric field may be reduced until the particles have come together again.

The next time step 70 is performed, the characteristic sensed may be the degree to which the particles are ordered and/or the number of defects. If the particles meet the predetermined condition then the method may end or it may proceed to a different task. If the particles 22 still fail to meet the predetermined condition, the process described above may be repeated or a modified method may be performed.

Many other variations of the present invention are also possible.

FIG. 6 illustrates another embodiment of the present invention in the form of a filter. In that embodiment, at least part of the container 12 is transparent to one or more wavelengths of light or other electromagnetic energy of interest. The light or other electromagnetic energy (represented as "λ1+λ2") enters the apparatus 10 and encounters the particles 22 at the interface 20. The spacing of the particles 22 can be adjusted by the processor 32 by controlling the voltage supply 40 so that certain wavelengths of light or electromagnetic energy are passed or reflected by the particles, as desired. By changing the spacing and/or arrangement of the particles 22, the wavelengths of interest can be changed and the filter according to the present invention can be made to be variable.

For example, the spacing of the particles 22 may be selected to reflect one or more wavelengths of light (λ1) and to pass one or more wavelengths of light (λ2). The wavelengths that are reflected and passed can be changed by changing the spacing of the particles 22. Different light wavelengths may be handled by the superimposition of various monolayers. For instance, all the light may be absorbed in order to reduce light reflection (or even prevent reflection altogether) or, in contrast, all the light could be reflected. Many other variations are also possible. As will be described in more detail herein, the present invention may utilize more than one interface 20, with particles 22 at each of the more than one interface. In that way, different particle 22 spacing and different particle 22 characteristics may be presented simultaneously to the light or other energy or mass passing through the container 12.

The light or other electromagnetic energy may be carried to and from the apparatus 10 via optical fiber, free space device, waveguides, or by other means (collectively "50"). The present invention may also be used for applications other than light or electromagnetic filters.

FIGS. 7a and 7b illustrate another embodiment of the apparatus 10 in which the particles 22 are controlled to allow for the passage or the blockage of light or other energy passing through apparatus 10. In particular, particles 22 may be selected so that they absorb or reflect the light or other energy of interest. Accordingly, the spacing of the particles 22 can be controlled to selectively allow the light or other energy to pass through the apparatus 10 or to be blocked by the particles 22.

In FIG. 7a the particles 22 are controlled (as described in more detail herein) so that the particles 22 come together and form a barrier to block the light or other energy.

In FIG. 7b, the particles 22 are controlled (as described in more detail herein) so that they are spaced apart, providing openings through which the light or other energy may pass.

Many other variations are also possible with the present invention. For example, the present invention can be used to separate particle 22 from each other and then reassemble the particles 22 in a more ordered array, with fewer defects, more even spacing, and better short and long range order. The present invention can also be used to form desired structures in the particles 22 so as to form films and coatings from the particles 22. As described above, the present invention can also be used to change and control the spacing of particles 22, and thereby provide a method and apparatus for various forms of (possibly nano-) porous membranes or filters, such as light filters, particulate filters, and other types of filters. Those and other variations are possible with the present invention.

Figure 8:
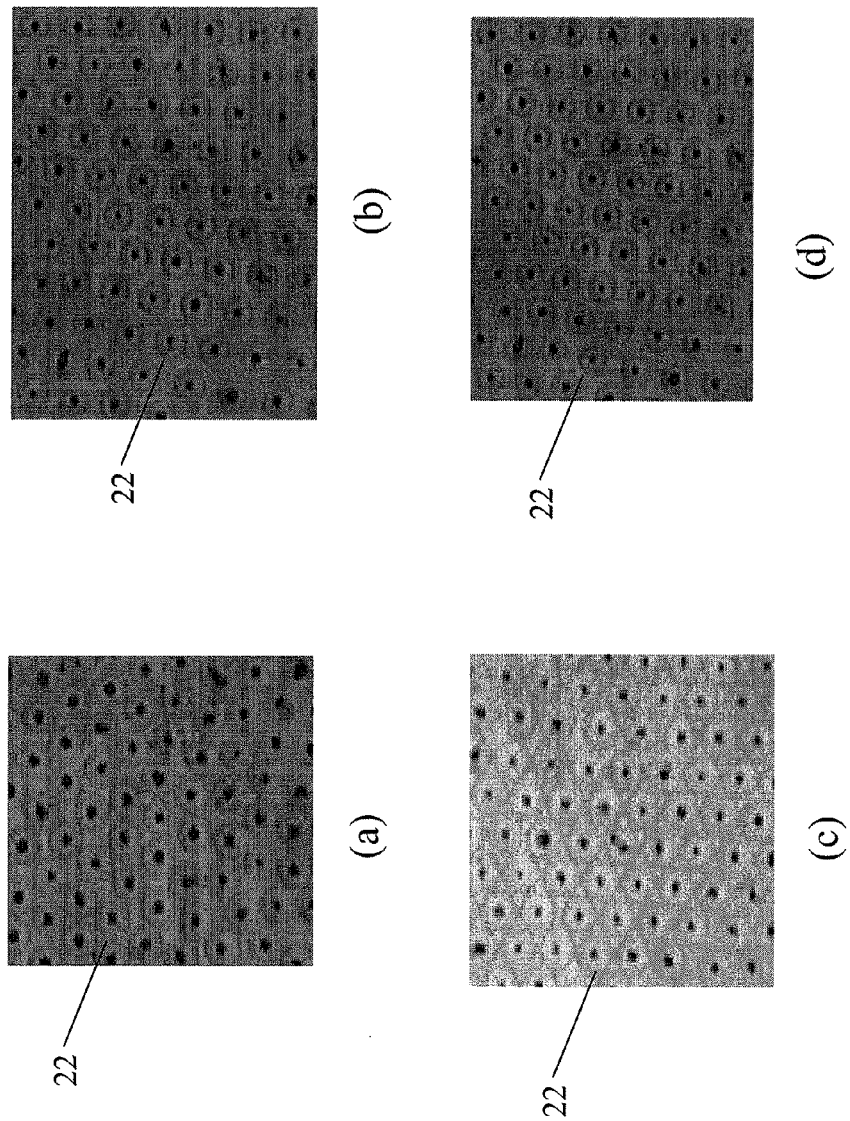
FIG. 8 illustrates one embodiment of the operation of the present invention in the form of re-ordering particles into a more ordered array.

FIG. 8 illustrates one embodiment of the operation of the present invention in the form of re-ordering particles into a more ordered array. In this embodiment, the particles 22 are glass, and the fluids 16, 18 are air and oil. The average radius of the particles 22 is 40.5 μm.

FIG. 8(a) illustrates the particles self-assembled under the action of the lateral capillary forces alone. The lattice is approximately triangular, but lacks long range order and contains many defects.

FIG. 8(b) illustrates the particles when a voltage V=5000 volt is applied across the electrodes 14. The particles 22 move away from each other and form a defect-free triangular lattice in which the distance between the particles is approximately 2.7 times the particle 22 radius.

FIG. 8(c) illustrates the particles 22 after the applied voltage is slowly decreased to 0 volt. The particles 22 touch each other in a well organized triangular lattice and the lattice exhibits long range order. Notice that the number of lattice defects is considerably reduced compared to that in (a) where the monolayer was assembled under the action of capillary forces alone.

FIG. 8(d) illustrates the particles 22 in a monolayer when 3500 volt are applied across the electrodes 14. The lattice spacing is smaller than in (b).

The electric field 24 is applied perpendicular to the interface 20 which allows the manipulation of the clustering of particles 22 floating at the interface 20 such that the particles 22 form well-controlled, and active monolayers. The technique is capable of not only expanding an already assembled monolayer but also tuning the lattice spacing. FIGS. 8b and 8c show that a cluster of glass particles 22 at the interface 20 can be expanded so that the particles 22 in the dilated state are arranged on a triangular (also called hexagonal) lattice, and shrunk again by decreasing the electric field 24 intensity. It is interesting to point out that the particle 22 arrangements are very different before turning on the electric field 24 (FIG. 8a) and after turning on the electric field 24 and decreasing it to zero (FIG. 8c). Irregularities in spacing of the particles 22 are present in absence of an electric field 24 (FIG. 8a). However, when the electric field 24 is turned on and slowly decreased to zero (FIGS. 8b and 8c), the particles 22 gain a well-ordered, triangular lattice arrangement and maintain it as the lattice distance decreases until the particles 22 touch each other. Therefore, the holes in between the particles 22 (i.e., the holes of the ultra-fine porous membrane) in this new state are also regular—the only irregularities remaining being due to the variation in the size of the particles 22 themselves.

FIG. 9 illustrates assembled glass particles 22 in the foam of a monolayer for particles with an average radius of 12 μm. FIG. 9 is similar to that illustrated in FIG. 8, except that the particles 22 used in FIG. 9 are smaller.

FIG. 9a illustrates the monolayer assembled under the action of capillary forces alone. FIG. 9b illustrates the monolayer formed by turning on the electric field 24, allowing the particles 22 to reorder themselves, and then decreasing the electric field 24 to zero. The monolayer in this figure is relatively less organized than that in FIG. 8 because the size variation of the particles 22 in this figure is significantly greater than that of FIG. 8.

FIG. 10 illustrates another example of the assembly of particles 22 according to the present invention. In that example, glass particles 22 are floating at an air-oil interface. The average radius of the particles is 23.5 μm. (a) Particles 22 self-assemble under the action of the lateral capillary forces alone. The lattice is approximately triangular, but lacks long range order and contains many defects. (b) When a voltage V=5000 volt is applied, particles 22 move away from each other and form a defect-free triangular lattice in which the distance between the particles 22 is approximately 2.7 times the particle radius. This order is maintained as the electric field is either increased or decreased, particularly as it is decreased to zero.

1. Analysis Overview

A more detailed analysis of the present invention will now be presented. The present invention includes the application of an electric field in the direction normal to a two-fluid interface to control the spacing of particle located at the interface. The present invention may be used, for example, as a process of particles self-assembly at the interface. The two-fluid interface can be between a liquid and a gas or an interface between two liquids.

The present invention allows for the clustering of particles at interfaces to be controlled, which is important because it allows for modifying the interfacial properties of two-phase systems and also because it can be used, for example, for the self-assembly of particles to form monolayers at two-liquid interfaces. See, for example, N. Bowden, I. S. Choi, B. A. Grzybowski, G. M. Whitesides, "Mesoscale self-assembly of hexagonal plates using lateral capillary forces: synthesis using the 'capillary bond'", *J. Am. Chem. Soc.* 121, 5373-5391 (1999); N. A. Bowden, A. Terfort, J. Carbeck, G. M. Whitesides, "Self-assembly of mesoscale objects into ordered two-dimensional arrays", *Science* 276, 233-235 (1997); and B. A. Grzybowski, N. Bowden, F. Arias, H. Yang, G. M. Whitesides, "Modeling of menisci and capillary forces from the millimeter to the micrometer size range", *J. Phys. Chem. B* 105, 404-412 (2001). See also the references in those documents.

Figure 11:
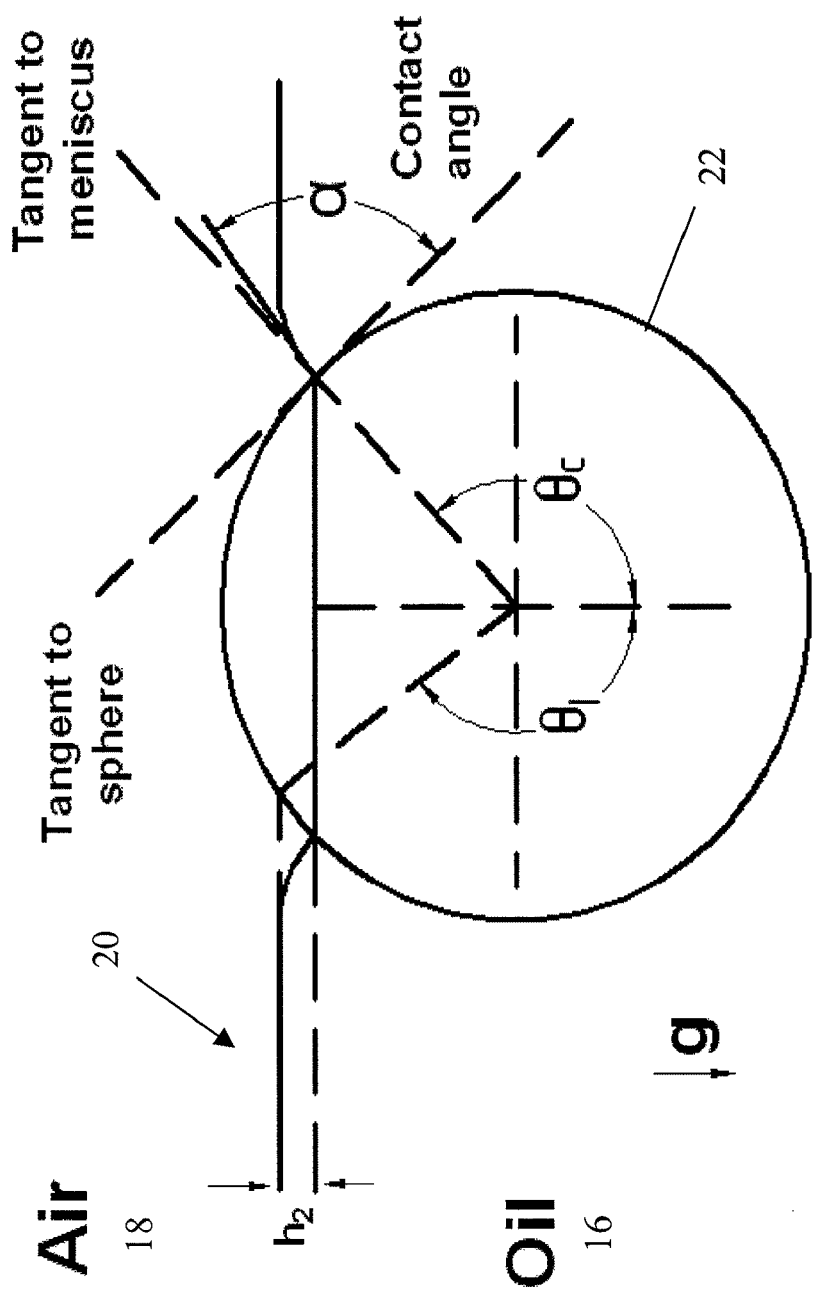
FIG. 11 is a schematic of a heavier than liquid hydrophilic (wetting) sphere of radius a hanging on the contact line at $\theta_c$.

FIG. 11 is a schematic of a heavier than liquid hydrophilic (wetting) sphere 22 of radius a hanging on the contact line at $\theta_c$. The point of extension of the flat meniscus on the sphere 22 determines the angle $\theta_1$ and $h_2$ is defined as $h_2 = a (\cos\theta_c - \cos\theta_1)$. The angle $\alpha$ is fixed by the Young-Dupré law and $\theta_c$ by the force balance.

In equilibrium, the vertical position of a floating particle 22 within a two-fluid 16, 18 interface 20 is such that the sum of the forces acting on the particle 22 in the direction normal to the interface 20 is zero. A particle 22 denser than the liquid 16 below can float on its surface because the vertical component of the capillary force, which arises due to the deformation of the interface 20, balances the particle's 22 buoyant weight. For a small particle 22 of radius a, the buoyant weight, which scales as $a^3$, becomes negligible, and therefore only a small interfacial 20 deformation is needed in this case for the vertical capillary force to balance the buoyant weight. Consequently, the lateral capillary forces due to this small deformation of the interface are too small to move micron and nano sized particles, and thus, small particles, in general, do not self-assemble. It is known that for particles floating on the air-water interface 20 the attractive capillary forces are significant only when the particle 22 radius is larger than ~10 μm. See, for example, N. Bowden, I. S. Choi, B. A. Grzybowski, G. M. Whitesides, "Mesoscale self-assembly of hexagonal plates using lateral capillary forces: synthesis using the 'capillary bond'", *J. Am. Chem. Soc.* 121, 5373-5391 (1999); N. A. Bowden, A. Terfort, J. Carbeck, G. M. Whitesides, "Self-assembly of mesoscale objects into ordered two-dimensional arrays", *Science* 276, 233-235 (1997); and B. A. Grzybowski, N. Bowden, F. Arias, H. Yang, G. M. Whitesides, "Modeling of menisci and capillary forces from the millimeter to the micrometer size range", *J. Phys. Chem. B* 105, 404-412 (2001).

This restriction, however, does not apply to particles trapped in thin films with a thickness smaller than the particle diameter. In fact, particles ranging from protein macromolecules to millimeter sized particles can self-assemble in such thin films. See, for example, P. A. Kralchevsky and K. Nagayama, "Capillary interactions between particles bound to interfaces, liquid films and biomembranes", *Advances in Colloid and Interface Science* 85, 145-192 (2000). Moreover, small particles can self-assemble if they are charged or if they have irregular contact lines. See, for example, D. Y. C. Chan, J. D. Henry Jr. and L. R. White, "The interaction of colloidal particles collected at the fluid interface", *J. Colloid Interface Sci.* 79, 410 (1981); and D. Stamou and C. Duschl, "Long-range attraction between colloidal spheres at the air-water interface: The consequence of an irregular meniscus", *Physical Rev. E* 62, 5263-5272 (2000). Furthermore, the two-fluid interface of the present invention includes a two-fluid interface with a thin film of another liquid at the interface, wherein the thickness of the film is less than the diameter of the particles at the interface.

Experiments with the present invention show that particles floating at a two-fluid interface can be self-assembled to form monolayers by applying an electric field normal to the interface, and that the lattice spacing of the monolayer thus formed can be adjusted by varying the electric field strength. The technique also leads to the formation of virtually defect free monolayers with long range order and, in principle, can be used for manipulating the assembly of sub micron sized particles in two-fluid interfaces. It thus overcomes all the shortcomings of the usual capillarity induced clustering mentioned earlier.

In the context of fluids and particles which are perfect dielectrics, we next discuss the dependence of the electrostatic force acting on a particle upon the parameters of the system such as the dielectric constants of the fluids and particles, the particles' position within the interface, and the distance between the particles. It is also shown that the component of the electrostatic force normal to the interface alters the deformation of the interface due to the particles, and thus the magnitude of the lateral capillary forces. The lateral component of the electrostatic force acting on the particles is repulsive, and its balance with the attractive capillary force is used to determine the equilibrium distance between the particles. It is assumed that both the particles and the fluids considered here are perfect dielectrics. If they are not (they are conductive), the dielectric constant needs to be replaced by the real part of the complex permittivity (with includes both the dielectric constant and the conductivity) and double layer effects in the vicinity of the particle surface may not be negligible.

2. Electrostatic Forces, Governing Equations and Dimensionless Parameters

Figure 12:
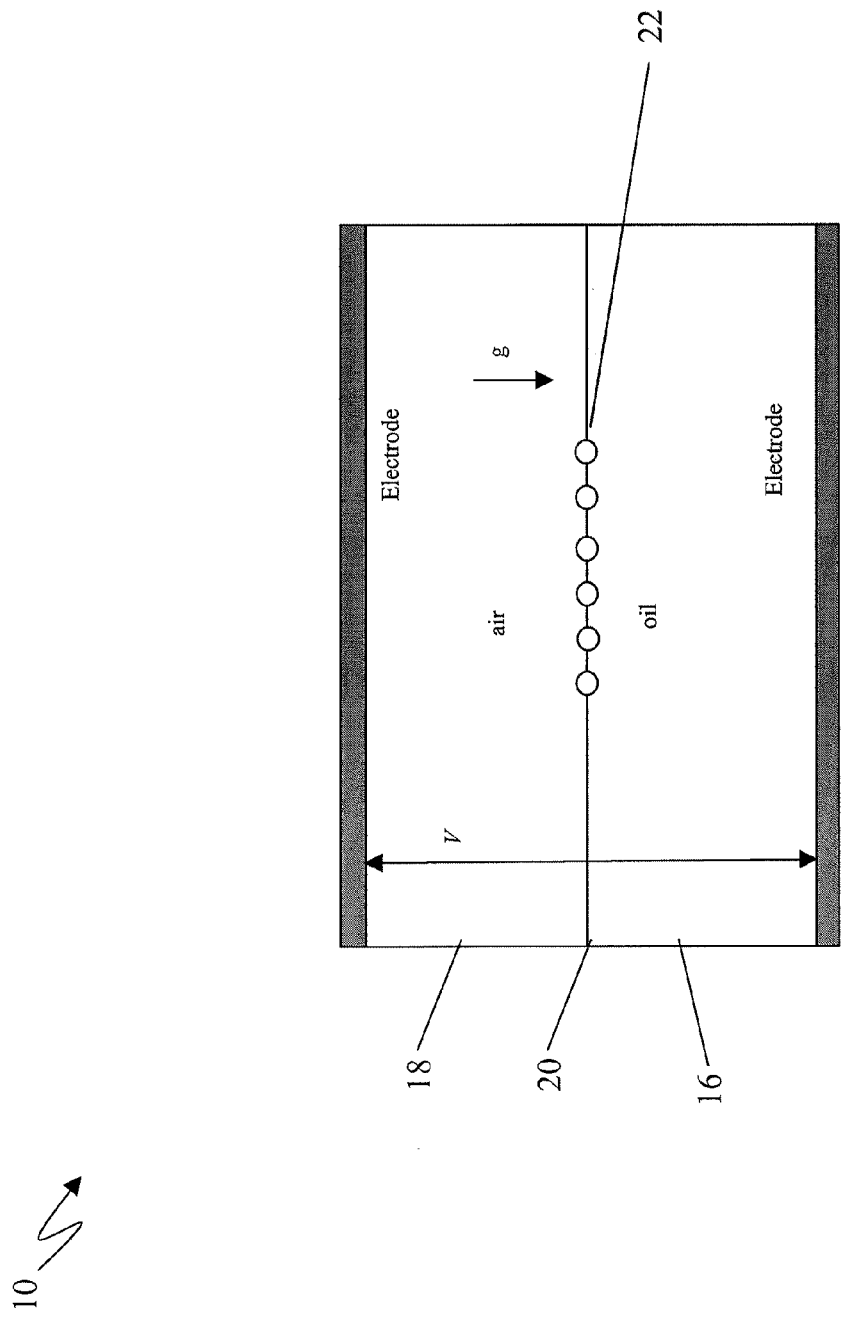
FIG. 12 is a schematic of one embodiment of an apparatus according to the present invention.

FIG. 12 is a schematic of one embodiment of an apparatus 10 according to the present invention. The apparatus was used to assemble particles 22 on the surface 20 of corn oil 16. The distance between neighboring particles 22 is controlled by adjusting the magnitude of the applied voltage. An AC electric field with frequency 100 Hz was used to make the influence of conductivity negligible.

In the experiments described herein, the electric field away from the interface 20 is uniform and normal to the undeformed interface 20. While an isolated uncharged dielectric particle placed in a uniform electric field becomes polarized, it does not experience any electrostatic force. This, however, is not the case for a particle 22 floating at a two-fluid interface 20 between two fluids 16, 18 with different dielectric constants because of the mismatch between the dielectric constants of the two fluids involved. Moreover, from symmetry the electrostatic force acting on an isolated spherical particle at an interface can only be in the direction normal to the interface, but depending on the parameter values it can be either upward or downward. If the particle is charged, a coulomb force also acts on the particle. In addition, when there are other particles present at the interface they interact with each other via electrostatic (to first order, dipole-dipole) interactions. We now proceed to compute the electrostatic force acting on the particles at the interface, first briefly describing the numerical method used.

2.1 Numerical Method

Let us denote the domain containing the two fluids and spherical particles (of identical radii and properties) by $\Omega$, the interior of the ith particle and its surface by $P_i(t)$ and $\partial P_i(t)$, respectively, and the domain boundary by $\Gamma$. To calculate the electric field E, we first solve the electric potential problem for $\phi$ in $\Omega$, namely $\nabla \cdot (\in \nabla \phi) = 0$ subjected to the boundary conditions on the particle surfaces and the two-fluid interface. On the particle surface $\partial P_i(t)$, the conditions read $$\phi_1 = \phi_2, \quad \varepsilon_c \frac{\partial \phi_1}{\partial n} = \varepsilon_p \frac{\partial \phi_2}{\partial n},$$

where $\phi_1$ and $\phi_2$ are the electric potentials in the liquid and particle, and $\in_c$ and $\in_p$ are the dielectric constants of the fluid and particle. A similar boundary condition is applied at the two-fluid interface. The electric potential is prescribed on the electrodes as constant values and the normal derivative of the potential is taken to be zero on the remaining domain boundary. The electric field is then deduced from the equation $E = -\nabla \phi$. The Maxwell stress tensor $\sigma_M$ is given by $$\sigma_M = \varepsilon E E - \frac{1}{2} \varepsilon (E \cdot E) I,$$

where I is the identity tensor and the electrostatic force acting on the ith particle is then obtained by integrating $\sigma_M$ over its surface, i.e.

$$F_{DEP} = \int_{\partial P_i(t)} \sigma_M \cdot n \, ds,$$

where n is the unit outer normal on the surface of the ith particle. The computational domain in our finite element code is discretized using a tetrahedral mesh and the boundary conditions are imposed on the surface of the particles. The resulting linear system of equations is solved using a multigrid preconditioned conjugate gradient method. See, for example, J. Kadaksham, P. Singh and N. Aubry, "Dynamics of electrorheological suspensions subjected to spatially non-uniform electric fields", *Journal of fluids engineering* 126, 170-179 (2004); J. Kadaksham, P. Singh and N. Aubry, "Dielectrophoresis of nano particles", *Electrophoresis* 25, 3625-3632 (2004); J. Kadaksham, P. Singh and N. Aubry, "Dielectrophoresis induced clustering regimes of viable yeast cells", *Electrophoresis* 26, 3738-3744 (2005); J. Kadaksham, P. Singh and N. Aubry, Manipulation of Particles Using Dielectrophoresis, *Mechanics Research Communications* 33, 108-122 (2006); N. Aubry and P. Singh, "Control of Electrostatic Particle-Particle Interactions in Dielectrophoresis", *Euro Physics Letters* 74, 623-629 (2006).

2.2 Vertical Electrostatic Force

As noted above, even though the applied electric field away from the interface is uniform, a particle within the interface experiences an electrostatic force normal to the interface due to a jump in dielectric constants across the interface. If the interface does not contain any particles, the electric field is normal to the interface and its intensity in the lower and upper fluids is constant, while changing discontinuously at the interface according to the boundary condition stated above.

Figure 13A:
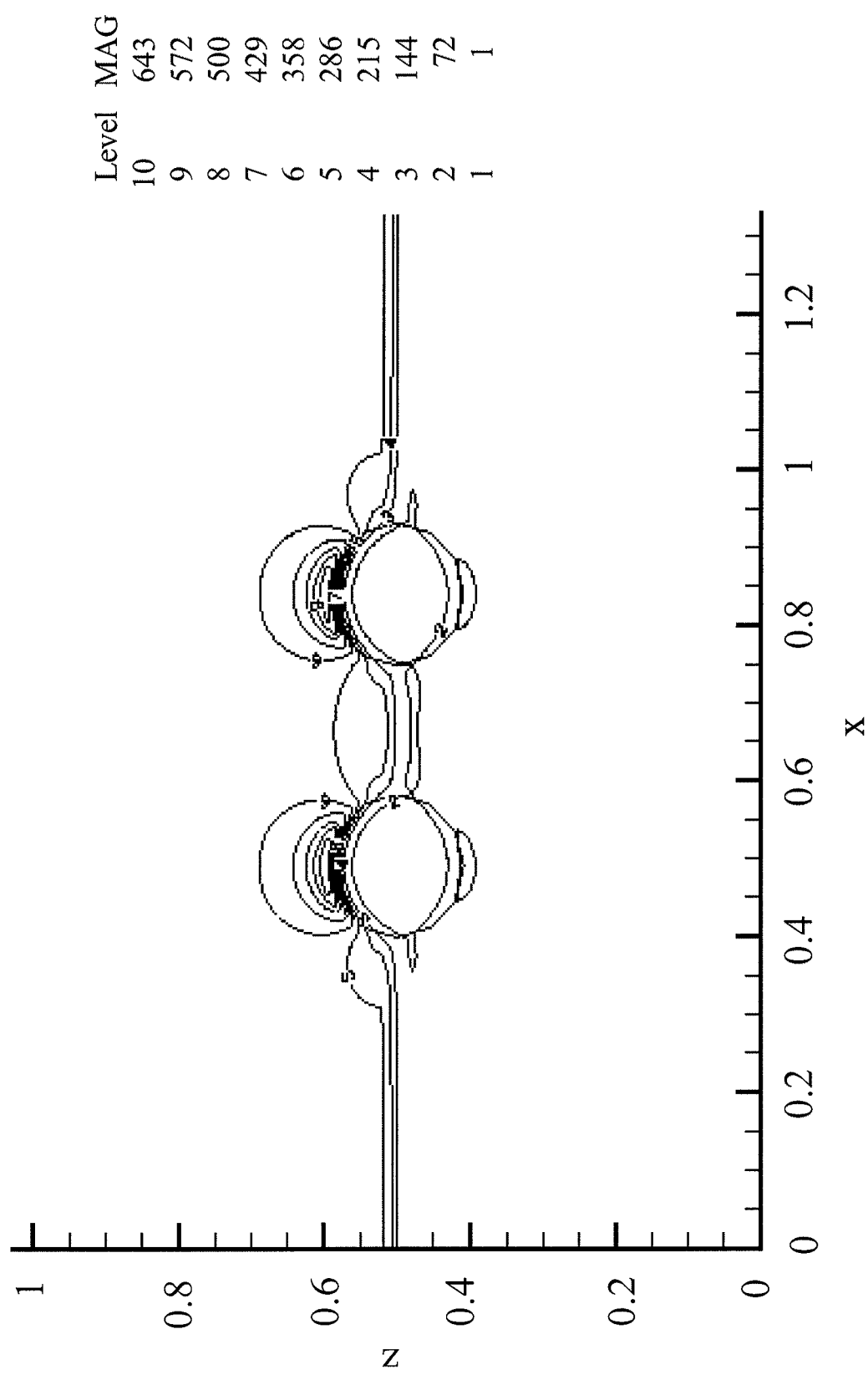
FIG. 13 illustrates the electric field intensity on the domain midplane passing through the particles centers for the device shown in FIG. 11 (assuming that there are two particles on the interface), for various dielectric constant values.
Figure 13B:
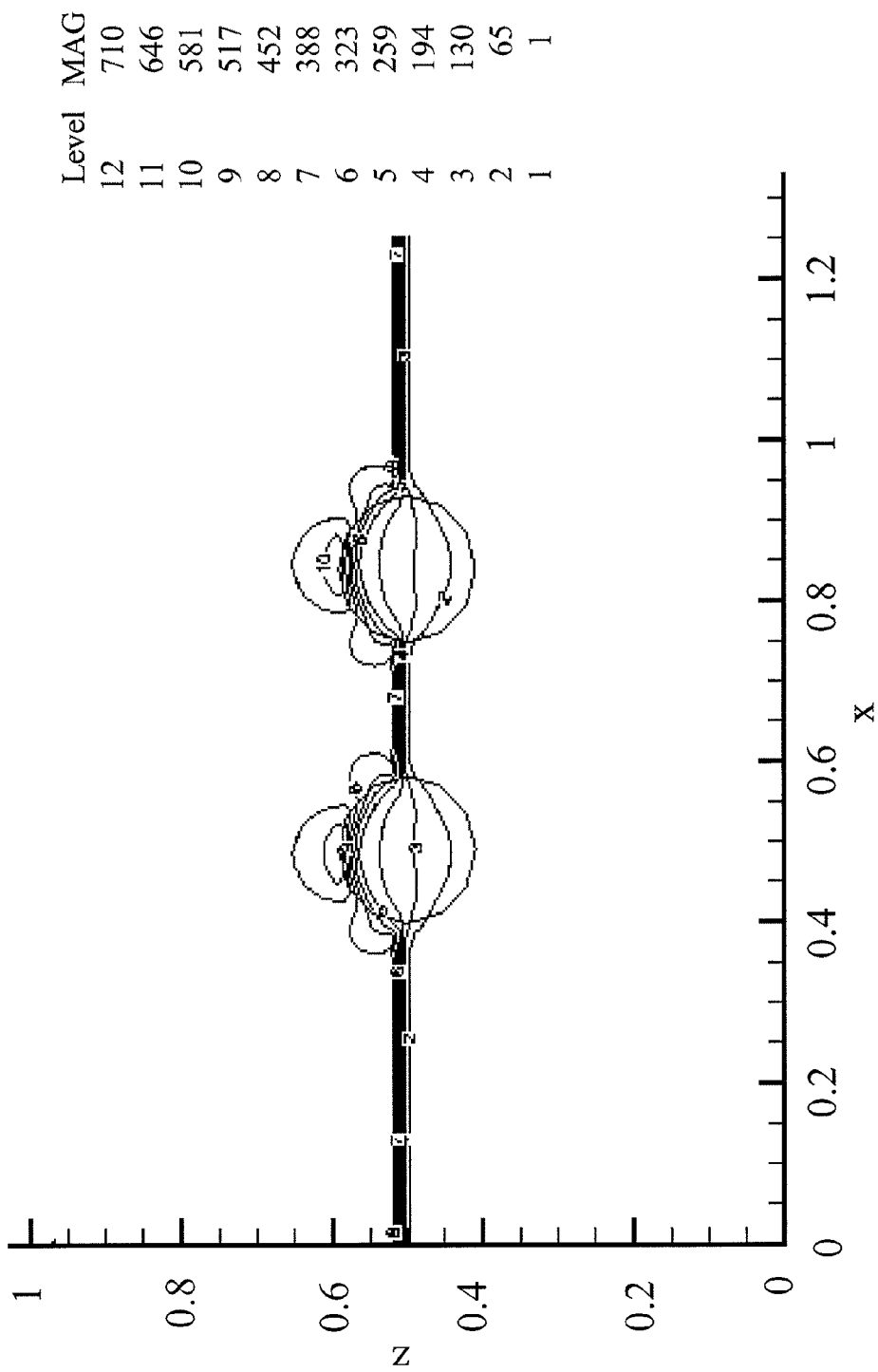
Figure 13C:
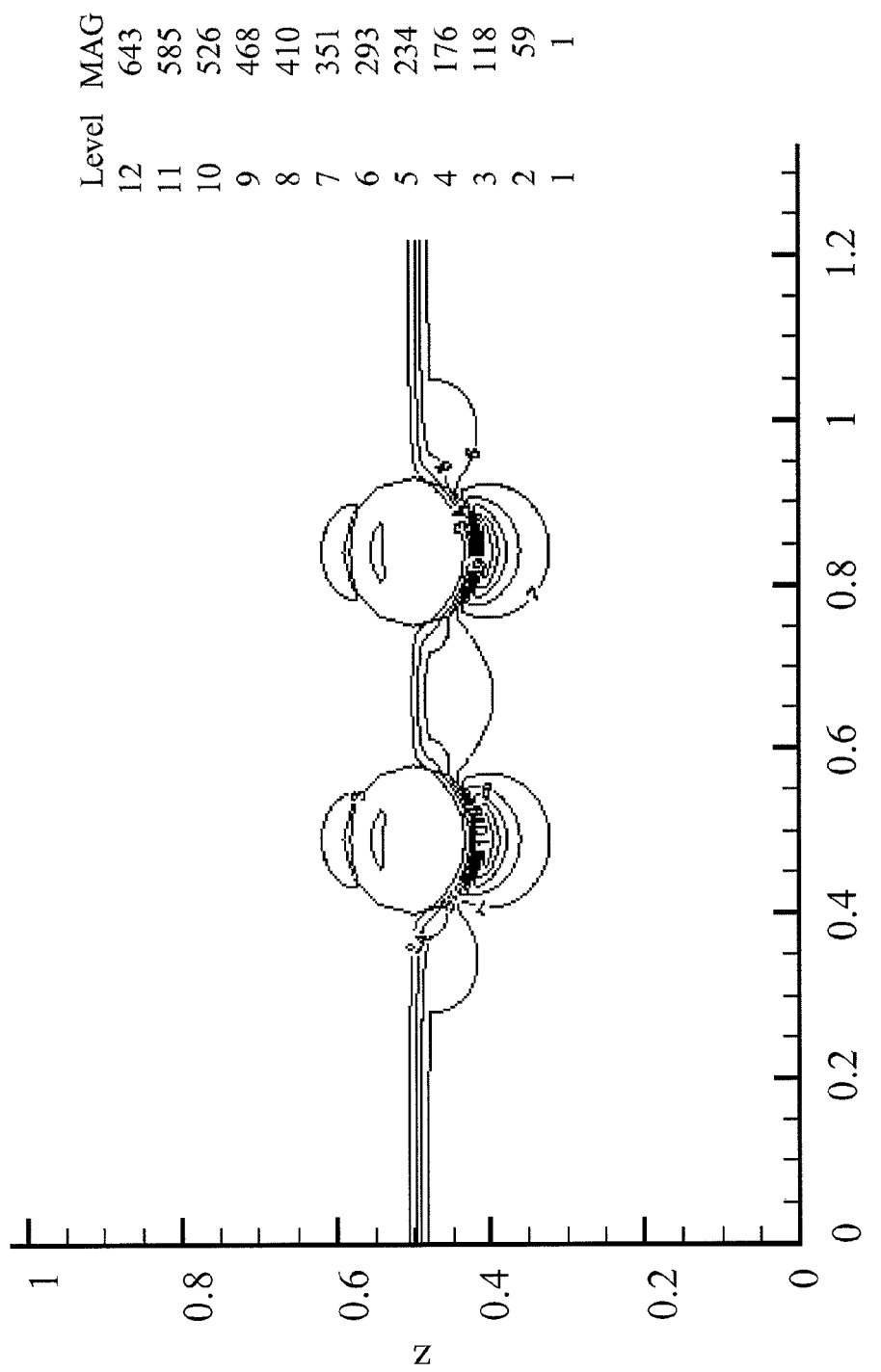

FIG. 13 illustrates the electric field intensity on the domain midplane passing through the particles centers for the device shown in FIG. 12, for various dielectric constant values. The spherical particles of radius a are placed so that their centers are aligned with the non-deformed interface and at a distance 2.6 a of each other. The spheres alter the electric field distribution, and experience an electrostatic force. The dielectric constants of the upper fluid, lower fluid and the particles were set to: (a) $\in_a=1, \in_L=5$ and $\in_p=2$. The vertical force is 4.16 and the lateral force is −0.156; (b) $\in_a=1, \in_L=2$ and $\in_p=2$. The vertical force is 3.39 and the lateral force is −0.34; (c) $\in_a=1, \in_L=0.5$ and $\in_p=2$. The vertical force is −1.49 and the lateral force is −0.124. In all cases, the lateral electrostatic force is repulsive while the vertical electrostatic force can be either upward (a, b) or downward (c).

In the case of two spherical particles placed at the interface, the electric field distribution on the domain mid plane, which passes through the spheres centers, is shown in FIG. 13 for three different combinations of dielectric constants when the particle centers are at the undeformed interface. To compute the electrostatic force acting on the particles, we must first determine the shape of the interface which, in general, is deformed due to the presence of the particles. The deformed interface shape can be computed by solving the equations of motion for the fluids and the particles and for the interface, subjected to the contact angle and boundary conditions. This, however, is difficult to do analytically and is not necessary to use in the present invention. The dielectric constant of the upper fluid is assumed to be one, while those of the lower fluid and the particles are varied. The figure shows how the particles presence at the interface modifies the electric field distribution. In particular, the electric field is the weakest in the fluid or particle region in which the dielectric constant is the largest and the strongest in the region for which the dielectric constant is the smallest. For example, in FIG. 13$a$ where the dielectric constant of the particles has a value in between the dielectric constants of the lower and upper fluids, the electric field intensity is the strongest in the upper fluid, the weakest in the lower fluid and in between these two values inside the particles. It follows that the magnitude of the vertical electrostatic force on the particle, as well as its direction, depends on the dielectric constant values. For example, the force is positive (acts against gravity) in FIGS. 13$a$ and 13$b$, and negative in FIG. 13$c$. The lateral electrostatic force is repulsive in all three cases, but its magnitude depends on the dielectric constant values and is different for the three cases.

Figure 14A:
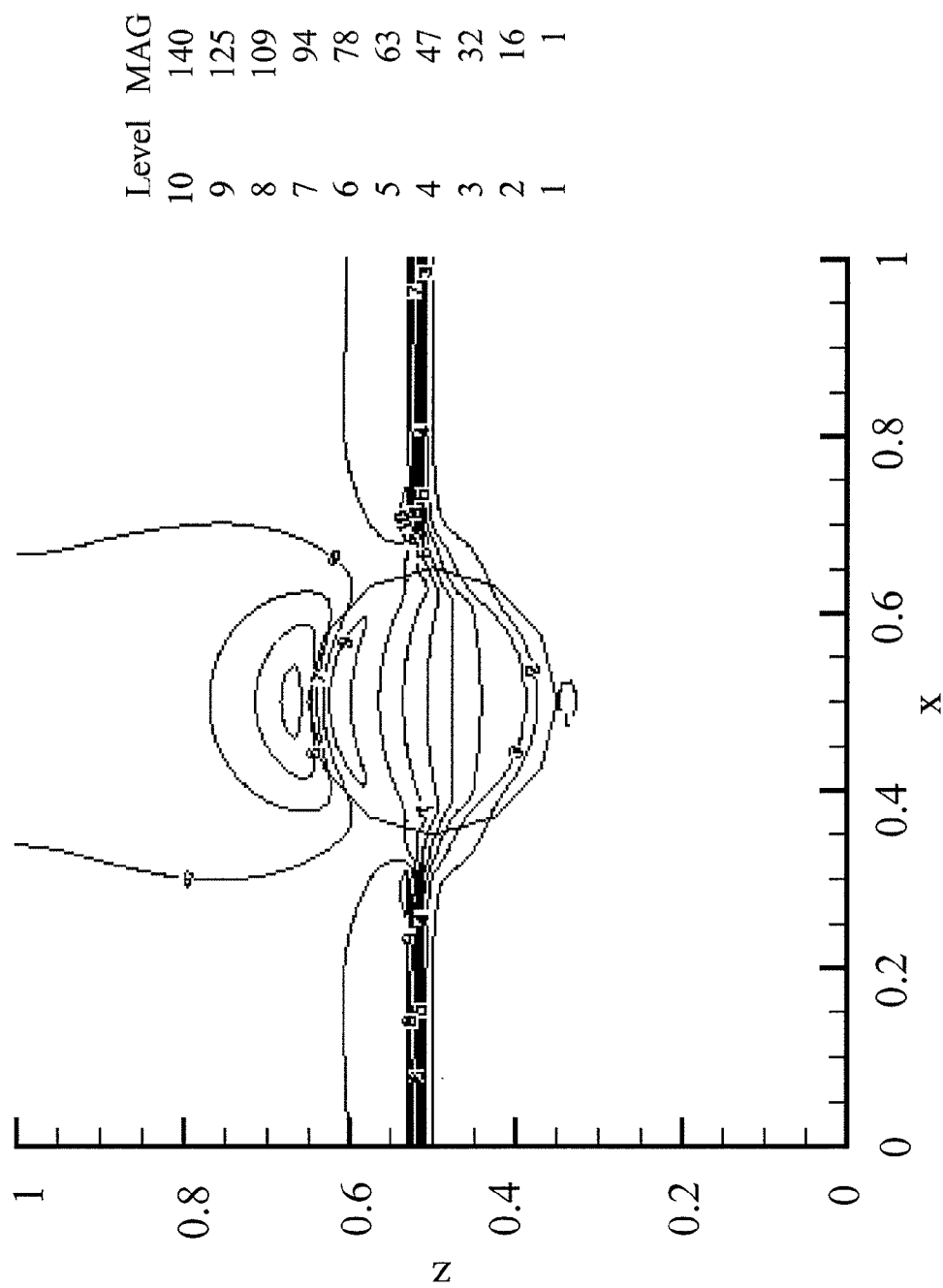
FIG. 14 illustrates electric field intensity on the domain midplane for the device shown in FIG. 11 in which one particle is placed at the interface.
Figure 14B:
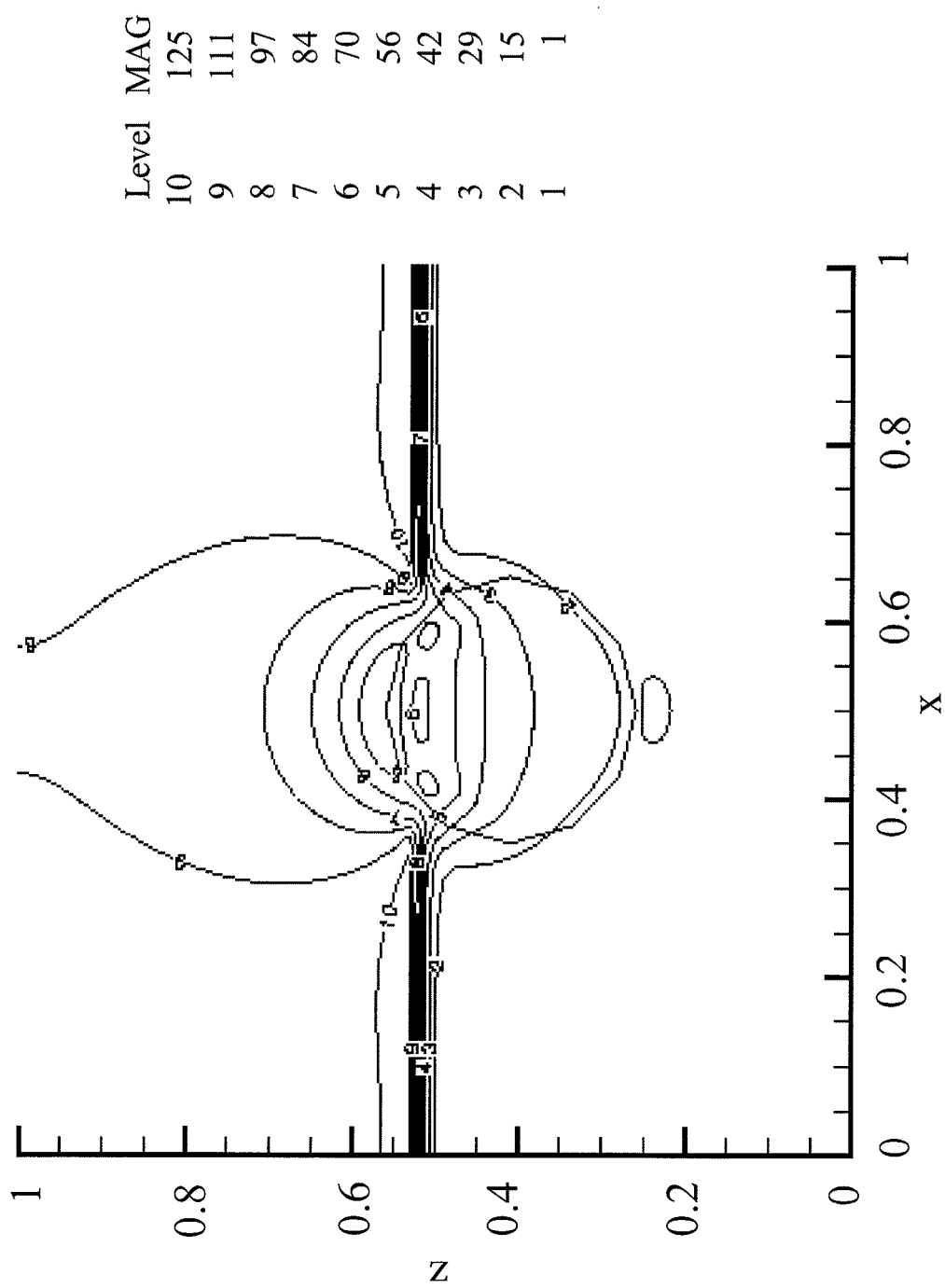
Figure 14C:
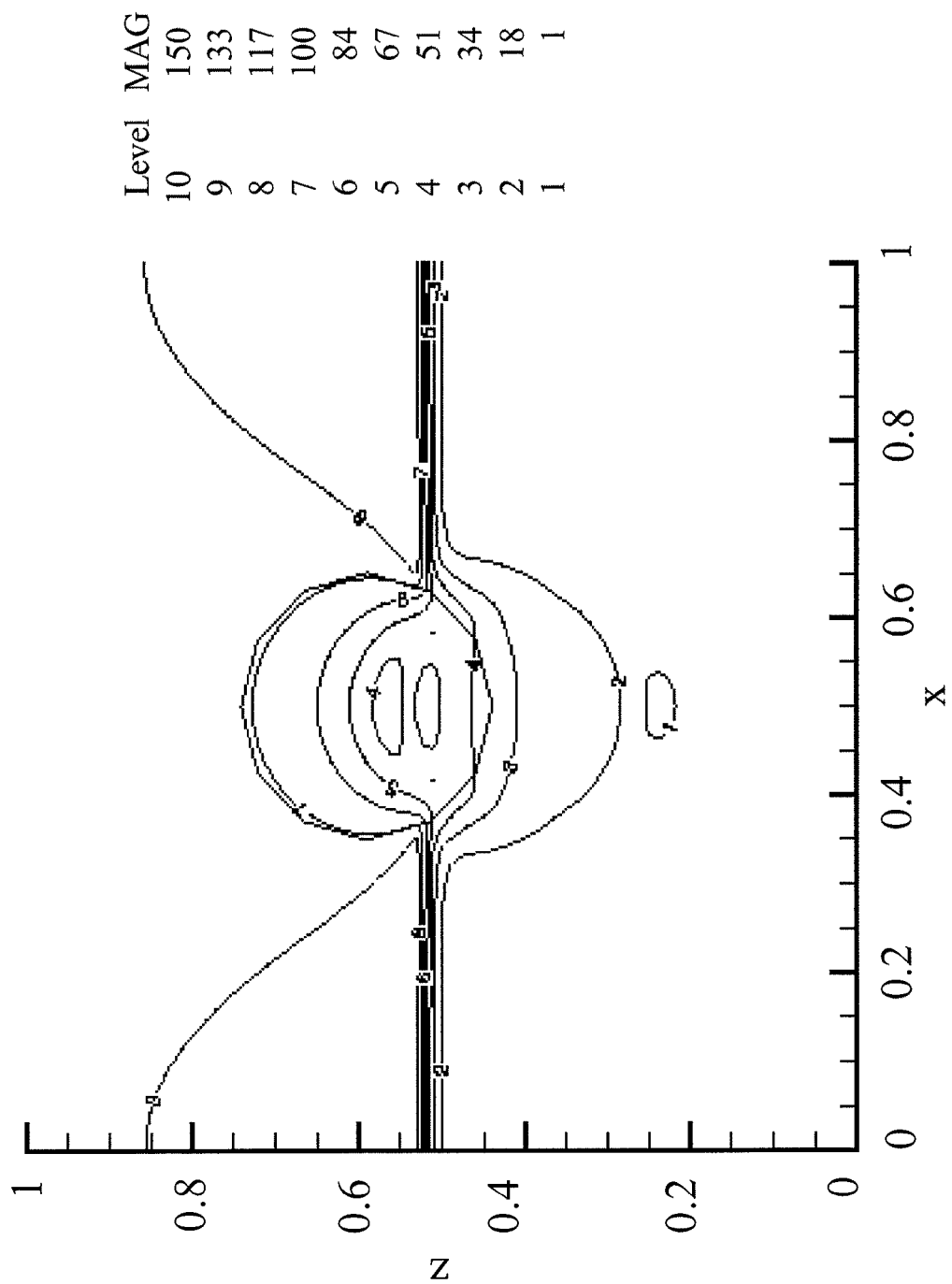

We now turn to the electric field distribution around a particle when its position within the interface is altered. FIG. 14 illustrates electric field intensity on the domain midplane for the device shown in FIG. 12 in which one particle is placed at the interface. The dependence of the electric field upon the position of the particle within the interface is studied. The dielectric constants were set to: $\epsilon_a=1$, $\epsilon_L=5$ and $\epsilon_p=0.5$. The particle alters the electric field distribution and experiences an electrostatic force in the vertical direction. The direction of the force, as well as its magnitude, depends on the particle position within the interface. (a) The sphere center is at the interface. The vertical electrostatic force is 0.354 (in the upward direction). (b) The sphere center is at a distance of 0.6$a$ below the interface. The vertical electrostatic force is $-2.22$ (in the downward direction). (c) The sphere center is at a distance of 0.6$a$ above the interface. The vertical electrostatic force is 0.553.

Because of the presence of the interface the electric field around the particles is not symmetric and, as a result, the particle experiences an electrostatic force in the direction normal to the interface. For these calculations, the dielectric constants of the upper fluid, the lower fluid and the particle are set to $\epsilon_a=1.0$, $\epsilon_L=5.0$, $\epsilon_p=0.5$. FIG. 14$a$ shows that a particle with its center at the undeformed interface experiences an electrostatic force in the upward direction. The electric field distributions for the cases when the particle center is below and above the undeformed, flat interface are shown in FIGS. 14$b$ and 14$c$. The electrostatic force is in the upward direction in the former case and in the downward direction in the latter case.

Our numerical results show that the vertical component of the electrostatic force in a DC field (or time averaged force in an AC field) acting on a particle can be written as:

$$F_{ev} = a^2 \epsilon_0 \epsilon_a \left(\frac{\epsilon_L}{\epsilon_a} - 1\right) E^2 f_v\left(\frac{\epsilon_L}{\epsilon_a}, \frac{\epsilon_p}{\epsilon_a}, \theta_c, \frac{h_2}{a}\right). \quad (1)$$

Figure 15:
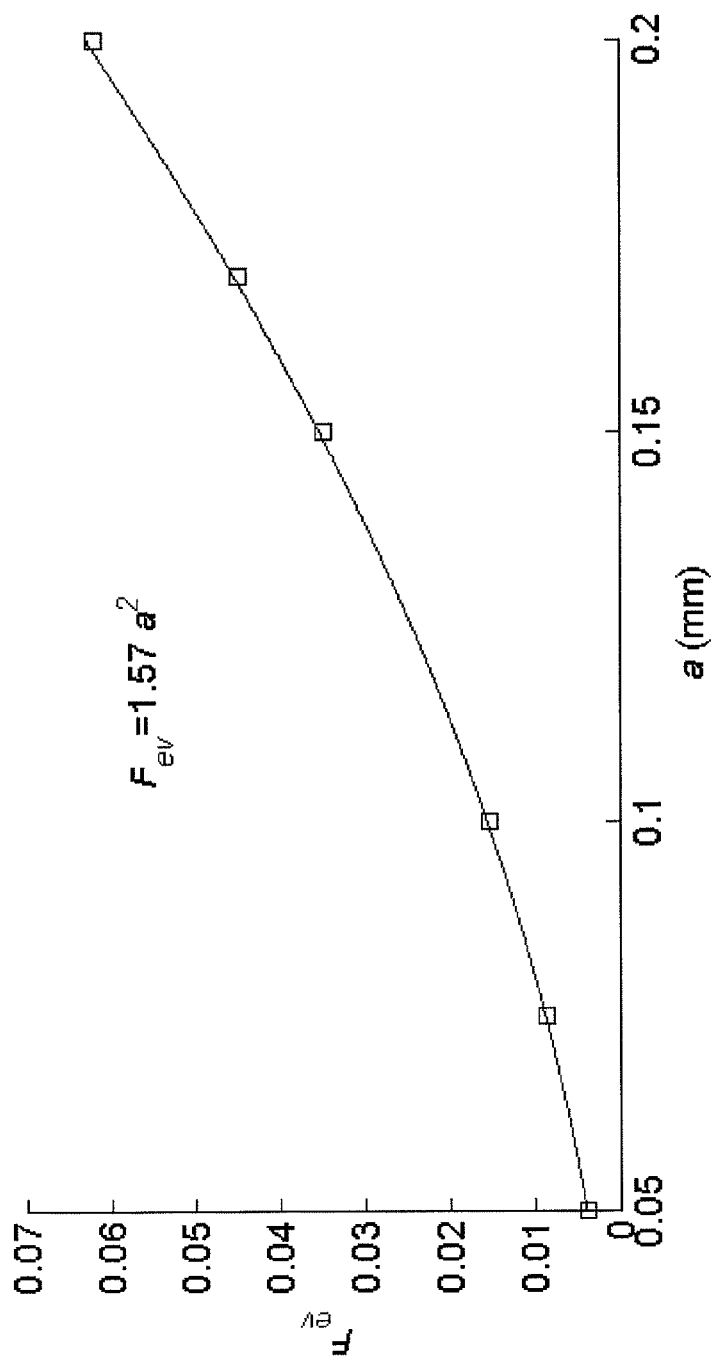

Here $a$ is the particle radius, $E=V_0/L$ is the average electric field strength away from the particle (or the RMS value of the electric field in an AC field), $\epsilon_p$, $\epsilon_a$ and $\epsilon_L$ are the dielectric constants of the particle, the upper fluid and the lower fluid, respectively, and $\epsilon_0=8.8542\times10^{-12}$ F/m is the permittivity of free space. Here, L is the distance between the electrodes, $V_0$ is the voltage difference applied to the electrodes, and $$f_v\left(\frac{\epsilon_L}{\epsilon_a}, \frac{\epsilon_p}{\epsilon_a}, \theta_c, \frac{h_2}{a}\right)$$

is a dimensionless function of the included arguments ($\theta_c$ and $h_2$ being defined in FIG. 11). The dependence of the force on the particle radius $a$ is quadratic which was established numerically as shown in FIG. 15. In particular, FIG. 15 illustrates the vertical electrostatic force computed numerically and plotted as a function of the particle radius $a$, along with the best power law fit, showing the quadratic dependence of the force on the particle radius. The dielectric constants were assumed to be: $\epsilon_a=1$, $\epsilon_L=2$ and $\epsilon_p=1.5$. The factor $$\left(\frac{\epsilon_L}{\epsilon_a} - 1\right)$$

ensures the fact that the force is zero when $$\frac{\epsilon_L}{\epsilon_a} = 1$$

as the fluids dielectric constants are the same in this case. It is assumed that the interface is flat and intersects the particle's surface at $\theta_c$ (see FIG. 11). One of the focuses of this patent is on the behavior of small floating particles for which the interfacial deformation is negligible, and thus $\theta_c \approx \pi - \alpha$ where $\alpha$ is the contact angle (see FIG. 11). In addition, the influence of electrowetting is considered only in the sense that if there is a change in the effective contact angle, the resulting change in the particle's position within the interface can be accounted for by changing $\theta_c$. See, for example, F. Mugele and J. Baret, "Electrowetting: from basics to applications", *J. Phys.: Condens. Matter* 17, R705-R774 (2005). Also notice that the dependence of the electrostatic force on the particle radius $a$ is quadratic compared to the cubic dependence of the dielectrophoretic force which acts on a particle in a non-uniform electric field.

FIG. 16 illustrates the vertical electrostatic force coefficient $f_v$ plotted as a function of sin $\theta'_c$ for $\epsilon_L=1.1, 2, 5$ and 50. The dielectric constant of the particle is 2.0 (a) and 0.5 (b) and that of the upper liquid is 1.0. In FIG. 16, we have set $\epsilon_a=1$, and $\epsilon_p=2.0$ (FIG. 16$a$) or 0.5 (FIG. 16$b$), and studied the force coefficient $f_v$ as a function of sin $\theta'_c$ for various values $\epsilon_L$, where $$\theta'_c = \theta_c - \frac{\pi}{2}.$$

Figure 16A:
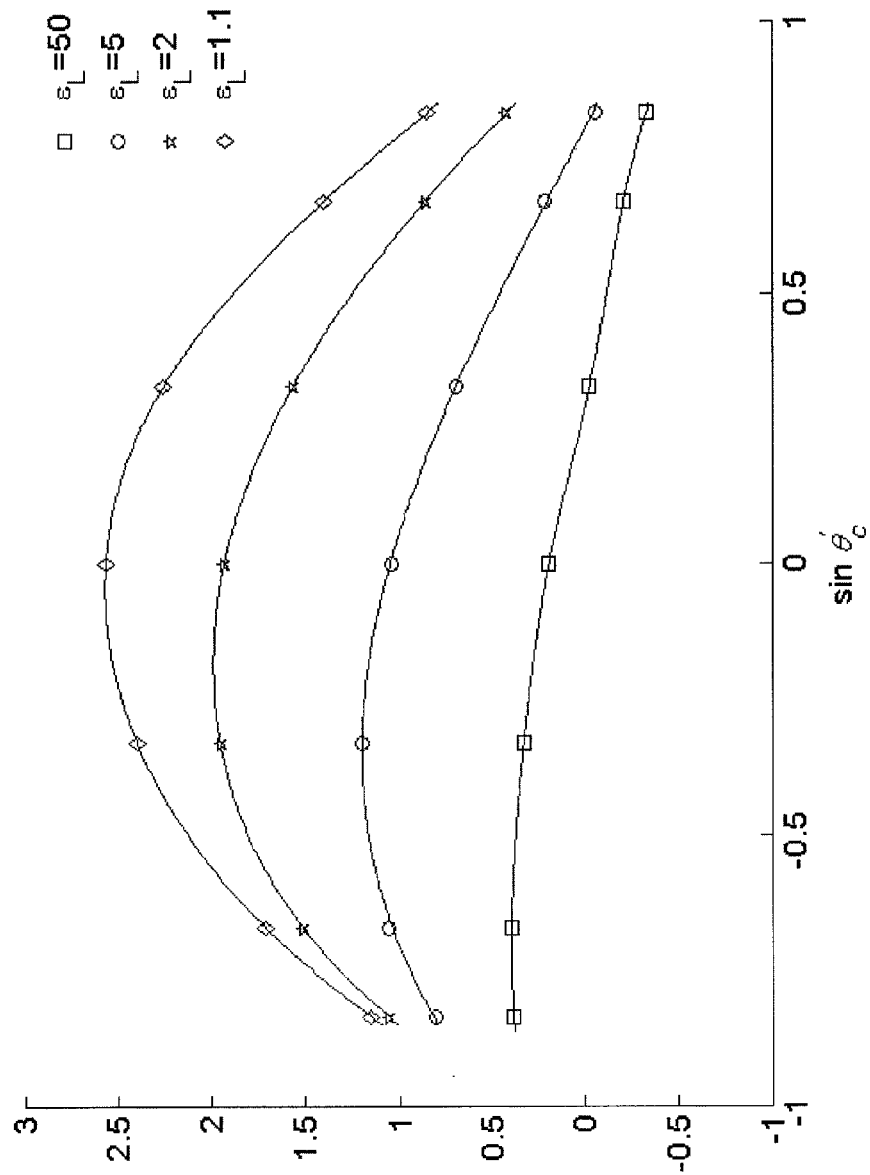
FIG. 16 illustrates the vertical electrostatic force coefficient $f_v$ plotted as a function of $\theta'_c$ for $\in_L = 1.1, 2, 5$ and 50.

Notice that it is sufficient to consider the case where $\epsilon_L > \epsilon_a$ because the electric force for the corresponding case where $\epsilon_L < \epsilon_a$ can be deduced from the results shown in FIG. 16 by simply reversing the direction of the force. The figure shows that for sin $\theta'_c < 0$ the force coefficient $f_v$ is positive for all cases investigated here and its magnitude decreases with increasing $\in_L$. A positive value of the electrostatic force for $\theta'_c<0$ implies that the particle is pushed into the upper liquid whose dielectric constant is smaller. However, from FIG. 16a we also notice that for $\in_L=5$ and sin $\theta_c>0.8$, and for $\in_L=50$ and sin $\theta'_c>0.3$, $f_v$ is negative, implying that the particle in these two cases is pushed into the lower liquid whose dielectric constant is larger. In other words, if the particle center is located below the interface at a distance larger than a critical distance (whose value depends on $\in_L$), the particle is pushed further downwards; otherwise, the electrostatic force pushes the particle upwards. Therefore, in the presence of an electric field the interface acts like a barrier because it opposes the motion of the particles across the interface. The figure, however, also suggests, since the vertical force is largely positive, that the electric force pushes particles into the fluid whose dielectric constant is smaller provided the latter are able to cross the interface barrier. The figure also shows that for $\in_L=1.1$ the force is maximal when $\theta'_c=0$ and that the angle $\theta'_c$ for which the force is maximal decreases with increasing $\in_L$.

Figure 16B:
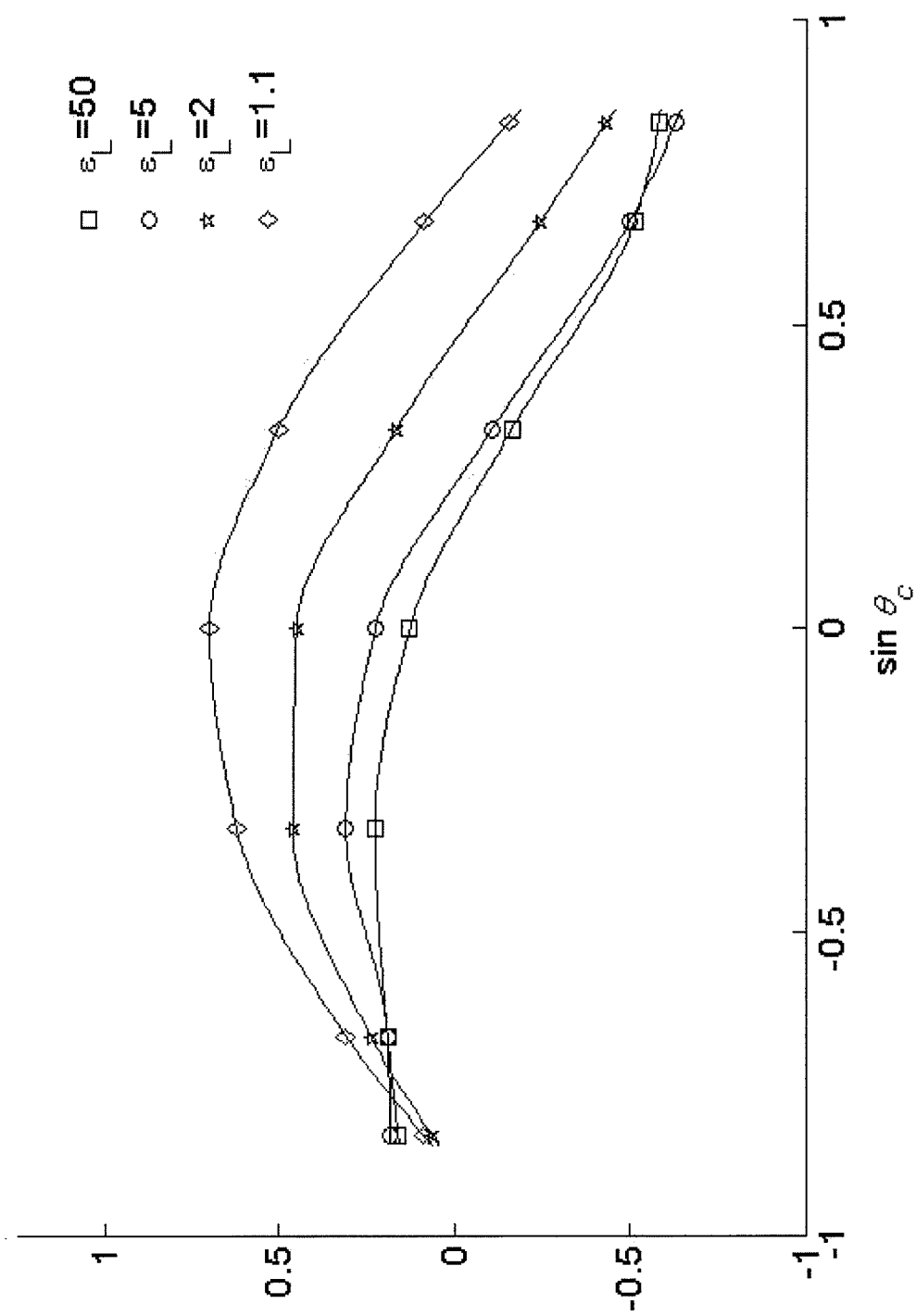

Similarly, for $\in_p=0.5$, shown in FIG. 16b, there is a critical value of $\theta'_c$ at which $f_v$ changes sign, and the critical value of $\theta'_c$ decreases with increasing $\in_L$. This, as in FIG. 16a, implies that the electrostatic force pushes the particle away from the flat interface, and thus, as it was the case above, the interface acts as a barrier for the particles. The critical value of $\theta'_c$ in FIG. 16b, however, is smaller than in FIG. 16a at the same $\in_L$ value. The actual vertical position ($\theta'_c$) of a particle is, of course, determined by the balance of the buoyant weight, the vertical component of the capillary force, and the vertical component of the electrostatic force.

2.3 Lateral Electrostatic Forces

The dipole-dipole interaction force between two dielectric spheres immersed in a fluid with the dielectric constant $\in_a$ and subjected to a uniform electric field, in the point-dipole limit, is given by the following well-known expression in spherical coordinates:

$$F_D(r, \theta) = f_0 \left(\frac{a}{r}\right)^4 ((3\cos^2\theta - 1)e_r + \sin 2\theta e_\theta) \quad (2)$$

where $f_0 12\pi\in_0\in_a^2\beta^2E^2$ (E being the magnitude of the uniform electric field along the z-axis), $\theta$ denotes the angle between the z-axis and the vector r joining the centers of the two particles, $$r = |r|, \quad \beta = \frac{\varepsilon_p - \varepsilon_a}{\varepsilon_p + 2\varepsilon_a}$$

is the Clausius-Mossotti factor, and $\in_p$ is the dielectric constant of the particle. See, for example, H. A. Pohl, 1978, "Dielectrophoresis: The behavior of neutral matter in nonuniform electric fields" (Cambridge: Cambridge University Press) (1978), pp. 38-47; Jones, T. B. Electromechanics of particles 1995, Cambridge University Press; F. Mugele and J. Baret, "Electrowetting: from basics to applications", *J. Phys.: Condens. Matter* 17, R705-R774 (2005); D. J. Klingenberg, S. Van Swol, C. F. Zukoski, "Dynamic Simulation of electrorheological suspensions", *J. Chem. Phys.* 91 (12), pp. 7888-7895 (1989); and W. R. Smythe, "Static and Dynamic Electricity", 3rd ed., McGraw-Hill, New York (1968), pp. 5-7. For particles trapped at the interface, the electric field is perpendicular to the line joining the centers of the particles, i.e., $\theta=\pi/2$, and thus the interaction force is repulsive and tangential to the interface.

Figure 17A:
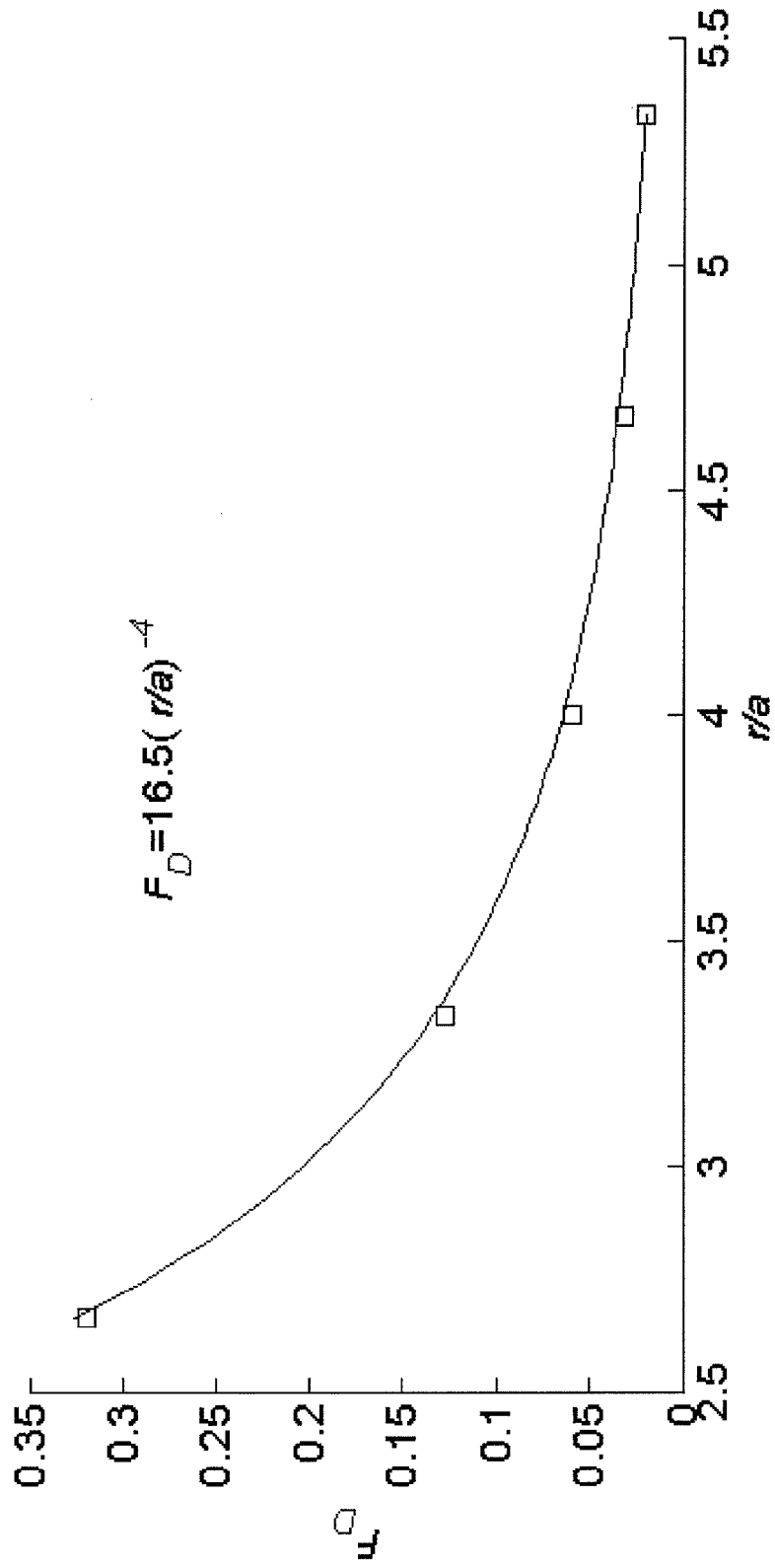
FIG. 17 illustrates the lateral dipole-dipole interaction force.
Figure 17B:
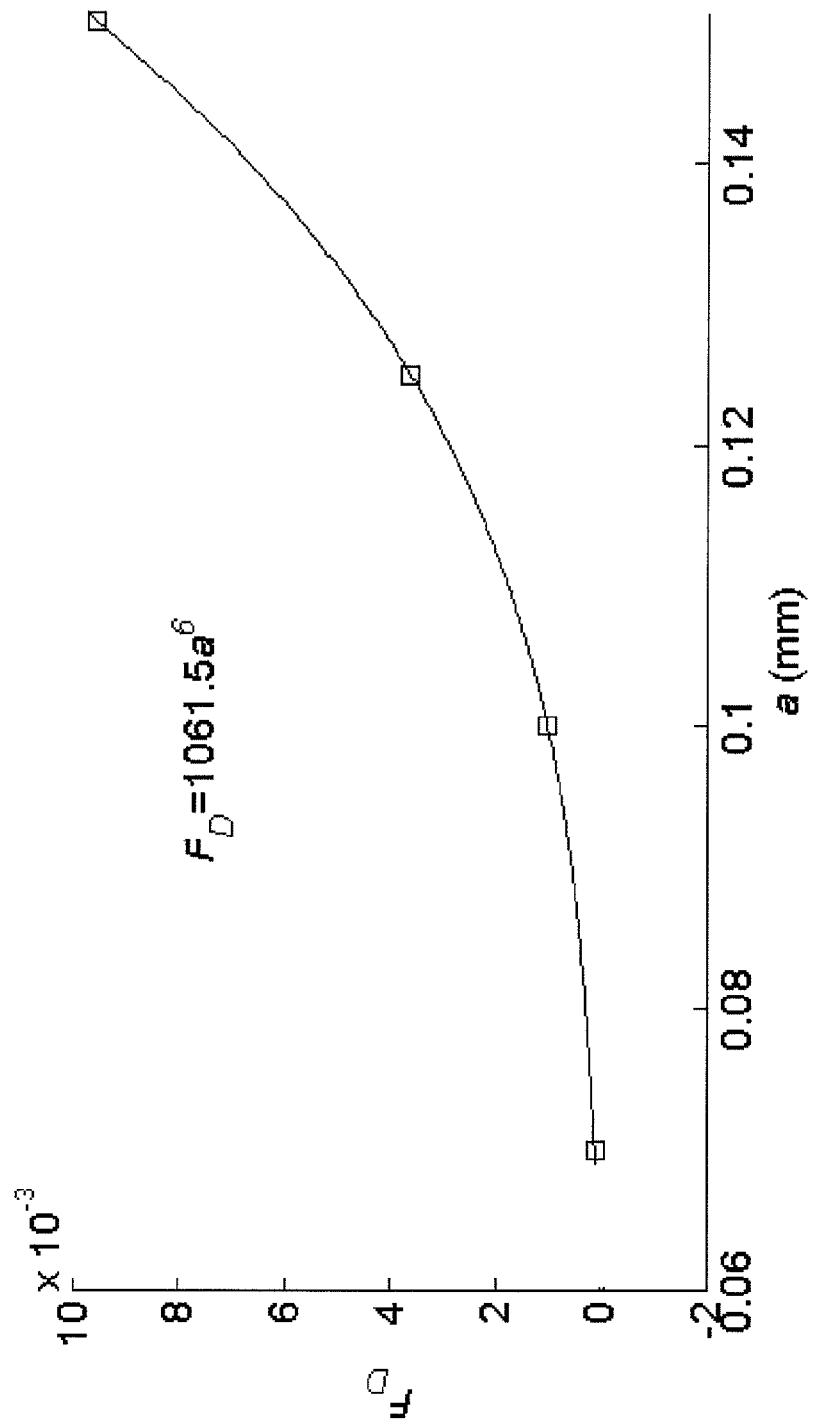

However, the above expression is not applicable to particles floating in an interface between two fluids with different dielectric constants, as the fluid's dielectric constant changes discontinuously across the interface. The computations described above were used to show that the lateral interaction force can be written as $$F_D(r) = \varepsilon_0\varepsilon_a\left(\frac{\varepsilon_L}{\varepsilon_a}+1\right)a^2E^2\left(\frac{a}{r}\right)^4 f_D\left(\frac{\varepsilon_L}{\varepsilon_a}, \frac{\varepsilon_p}{\varepsilon_a}, \theta_c, \frac{h_2}{a}\right) \quad (3)$$

where $f_D$ is a dimensionless function of the included arguments, with the force depending upon the sixth power of the particle radius a and on the fourth power of the inverse of the distance between the particles as shown in FIG. 17a-b.

FIG. 17 illustrates the lateral dipole-dipole interaction force computed numerically is plotted as a function of (a) the dimensionless distance r/a between the particles and (b) the particle radius a for a fixed distance r between the particles. The best power law fits, showing that the force depends on the inverse of the fourth power of the distance between the particles and on the sixth power of the particle radius, are also shown. The dielectric constants are assumed to be $\in_a=1$, $\in_L=2$ and $\in_p=1.5$.

As was the case for (1), the above expression is obtained by assuming that the interface is flat and that it intersects the sphere's surface at $\theta_c$. The force also depends on the dielectric constants of the two fluids involved, and the positions $\theta_c$ of the particles within the interface. The latter in this study is assumed to be the same for the two particles. However, if particles were not of the same type or size, their positions $\theta_c$ within the interface would be different, and the interaction force would be even more complex. The experimental technique, however, would still be applicable with a possibly varying gap in between particles of various types.

FIG. 18 illustrates the dipole interaction force coefficient $f_D$ plotted as a function of sin $\theta'_c$ for $\in_L=1.1, 2, 5$ and $50$. The dielectric constant of the particle is 2.0 (a) and 0.5 (b) and that of the upper liquid is 1.0. The distance between the particles is 2.6a.

Figure 18A:
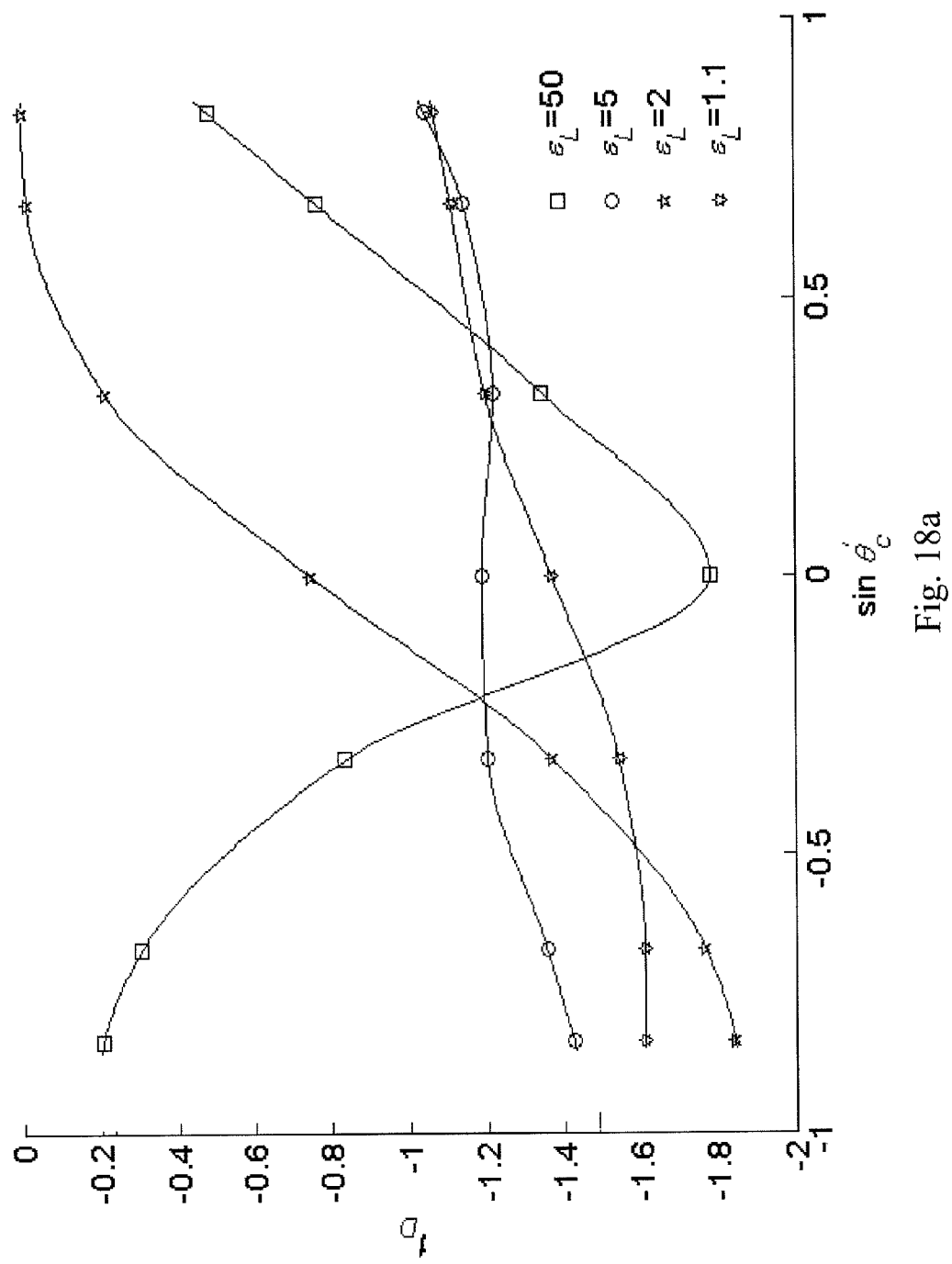
FIG. 18 illustrates the dipole interaction force coefficient $f_D$.
Figure 18B:
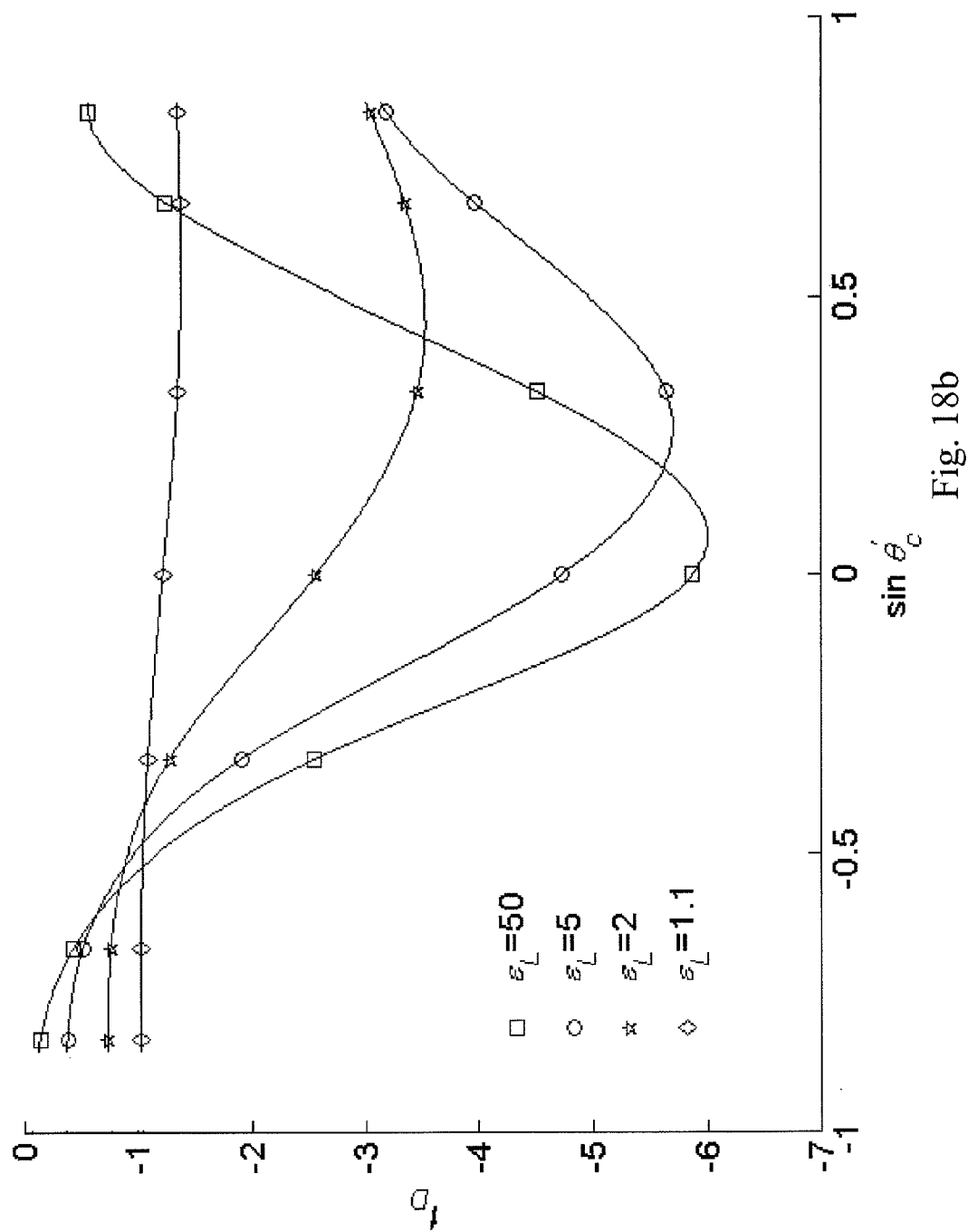

FIG. 18 displays the force coefficient $f_D$ as a function of sin $\theta'_c$ for $\in_a=1$, and $\in_p=2.0$ (FIG. 18a) and 0.5 (FIG. 18b). The force is repulsive for all values of $\in_L$ investigated. From FIG. 18a we note that for $\in_p=2.0$ and $\in_L=50$, the magnitude of $f_D$ is maximum when $\theta'_c$ is around zero, but is relatively independent of $\theta'_c$ for $\in_L=1.1$ and 5.0. Also notice that for $\in_L=2.0$, as expected, $f_D$ goes to zero when the sphere is completely submerged in the lower liquid as, in this case, the dielectric constant of the particles is the same as that of the lower fluid.

For the case corresponding to $\in_p=0.5$ shown in FIG. 18b, $f_D$ increases in magnitude with increasing $\theta'_c$ when $\theta'_c<0$ for $\in_L=1.1$ and 2.0. This is due to the fact that the dielectric constant of the lower fluid is larger than that of the upper fluid. However, for $\in_L=5$ and 50, $f_D$ attains a maximum value in magnitude and then decreases with increasing $\theta'_c$. This result suggests that for larger values of $\in_L$ the interface enhances the repulsive force between the particles.

The repulsive interaction energy $W_D$ between two particles can be obtained by integrating (3) with respect to r, which gives $$W_D(r) = -\frac{1}{3}\varepsilon_0\varepsilon_a\left(\frac{\varepsilon_L}{\varepsilon_a}+1\right)a^2E^2\left(\frac{a^4}{r^3}\right)f_D\left(\frac{\varepsilon_L}{\varepsilon_a}, \frac{\varepsilon_p}{\varepsilon_a}, \theta_c, \frac{h_2}{a}\right) \quad (4)$$

Let us assume that $\varepsilon_a=2.0$, $\varepsilon_L=4.0$, $E=3\times10^6$ volt/m, $f_D=3.1$, and $r=2a$. For these parameter values, the interaction energy is shown as a function of the particle radius in FIG. 19. For $a=1$ μm, $W_D(r)=\sim1.67\times10^4$ kT and for $a=100$ nm, $W_D(r)=\sim16.7$ kT, where k is the Boltzman constant and T is the temperature, indicating that the repulsive electrostatic force is larger than the random Brownian force acting on the particles. This shows that the electrostatic repulsive force (3) can be used to manipulate nanoparticles within a two-fluid interface.

2.4 Vertical Force Balance in Equilibrium

We next consider the vertical force balance for a spherical particle floating within the interface between two immiscible fluids. The buoyant weight $F_b$ of the particle is balanced by the capillary force $F_c$ and the electrostatic force $F_{ev}$, that is $$F_c + F_{ev} + F_b = 0 \quad (5)$$

The buoyant weight is given by $$F_b = -g\rho_L a^3 f_b\left(\frac{\rho_a}{\rho_L}, \frac{\rho_p}{\rho_L}, \theta_c, \frac{h_2}{a}\right),$$

where g is the acceleration due to gravity, $\rho_p$ is the particle density, $\rho_a$ and $\rho_L$ are the densities of the upper and lower fluids, $\theta_c$ and $h_2$ are defined in FIG. 11, and $f_b$ is a function of $$\frac{\rho_a}{\rho_L},$$

$$\frac{\rho_p}{\rho_L},$$

$\theta_c$ and $$\frac{h_2}{a}.$$

It is easy to deduce from FIG. 11 that the capillary force $F_c$ takes the expression $F_c=2\pi\gamma a \sin\theta_c \sin(\theta_c+\alpha)$, where $\alpha$ is the contact angle. Therefore, equation (5) can be rewritten as $$F_c = -2\pi\gamma a\sin\theta_c\sin(\theta_c + \alpha) \quad (6)$$

$$= g\rho_L a^3 f_b\left(\frac{\rho_a}{\rho_L}, \frac{\rho_p}{\rho_L}, \theta_c, \frac{h_2}{a}\right) - a^2\varepsilon_0\varepsilon_a\left(\frac{\varepsilon_L}{\varepsilon_a}-1\right)$$

$$E^2 f_v\left(\frac{\varepsilon_a}{\varepsilon_L}, \frac{\varepsilon_p}{\varepsilon_L}, \theta_c, \frac{h_2}{a}\right)$$

In dimensionless form, the previous equation reads $$2\pi \sin\theta_c \sin(\theta_c + \alpha) = \quad (6')$$
$$-B f_b\left(\frac{\rho_a}{\rho_L}, \frac{\rho_p}{\rho_L}, \theta_c, \frac{h_2}{a}\right) + W_E\left(\frac{\varepsilon_L}{\varepsilon_a}-1\right)f_v\left(\frac{\varepsilon_a}{\varepsilon_L}, \frac{\varepsilon_p}{\varepsilon_L}, \theta_c, \frac{h_2}{a}\right).$$

Here $B=\rho_L a^2 g/\gamma$ is the Bond number and $W_E=\varepsilon_0\varepsilon_a$ $$\frac{aE^2}{\gamma}$$

is the electric Weber number.

As the particle radius a approaches zero, the Bond number $B=\rho_L a^2 g/\gamma \to 0$. In this limit, in the absence of an electrostatic force, the right hand side of equation (6') is zero and thus $\sin(\alpha+\theta_c)\approx0$ or $\theta_c\approx-\alpha$ (see FIG. 11). This means that a small particle floats so that the interfacial deformation is insignificant. Hence, the lateral capillary force, which arises from the interfacial deformation, in this limit, is also insignificant. As noted earlier, for particles floating on water, this limit is reached when the particles radius is approximately 10 μm. See, for example, M. A. Fortes, "Attraction and repulsion of floating particles", *Can. J. Chem.* 60, 2889 (1982); W. A. Gifford and L. E. Scriven. "On the attraction of floating particles", *Chem. Engrg. Sci.* 26, 287-297 (1971); Kralchevsky, P. A., V. N. Paunov, N. D. Denkov, I. B. Ivanov and K. Nagayama, "Energetical and force approaches to the capillary interactions between particles attached to a liquid-fluid interface", *J. Colloid and Interface Sci.* 155, 420-437 (1993); J. Lucassen, "Capillary forces between solid particles in fluid interfaces", *Colloids Surf* 65, 131-137 (1992); P. Singh and D. D. Joseph, Fluid dynamics of Floating particles, *J. Fluid Mech.* 530, 31-80 (2005).

Another important limit is the case for which the Bond number approaches zero, but $W_E$ does not. This situation arises, for instance, for small particles when the magnitude of the electric field is sufficiently large. The equilibrium position of a particle within the interface in this case is determined by the balance of the interfacial and electrostatic forces alone. The interface is then deformed by the particle, and so the lateral (electric field induced) capillary forces are present and can cause particles within the interface to cluster.

2.5 Interfacial Deformation and Lateral Capillary Force

In equilibrium, the external vertical force acting on a particle is balanced by the vertical component of the capillary force which, as noted earlier, arises because of the deformation of the interface. The profile of the deformed interface around a particle can be obtained by integrating Laplace's equation and using the boundary conditions that (i) the interface far away from the particle is flat and (ii) the angle between the interface and the horizontal at the particle surface is known in terms of the total external force acting on the particle. It can be shown that the interface height $\eta(r)$ at a distance r from a spherical particle is given by:

$$\eta(r) = \alpha \sin(\theta_c + \alpha) K_0(qr) \quad (7)$$

where $K_0(qr)$ is the modified Bessel function of zeroth order and q=

$$\sqrt{\frac{(\rho_L - \rho_a)g}{\gamma}}.$$

In obtaining the above expression we have ignored the influence of the electrostatic stress on the interface, including the stress that arises due to the presence of the particle, and assumed that the interfacial deformation is small. For more on the interface height η(r) at a distance r from a spherical particle, see M. A. Fortes, "Attraction and repulsion of floating particles", *Can. J. Chem.* 60, 2889 (1982); W. A. Gifford and L. E. Scriven. "On the attraction of floating particles", *Chem. Engrg. Sci.* 26, 287-297 (1971); Kralchevsky, P. A., V. N. Paunov, N. D. Denkov, I. B. Ivanov and K. Nagayama, "Energetical and force approaches to the capillary interactions between particles attached to a liquid-fluid interface", *J. Colloid and Interface Sci.* 155, 420-437 (1993); J. Lucassen, "Capillary forces between solid particles in fluid interfaces", *Colloids Surf* 65, 131-137 (1992); P. Singh and D. D. Joseph, Fluid dynamics of Floating particles, *J. Fluid Mech.* 530, 31-80 (2005); P. A. Kralchevsky and K. Nagayama, "Capillary interactions between particles bound to interfaces, liquid films and biomembranes", *Advances in Colloid and Interface Science* 85, 145-192 (2000); and M. M. Nicolson, "The interaction between floating particles", *Proc. Cambridge Philosophical Soc.*, 45, 288 (1949).

Let us consider a second particle at a distance r from the first particle. The height of the second particle is lowered because of the interfacial deformation caused by the first particle, and thus the work done by the electrostatic force and gravity (buoyant weight) is $$W_c = -\eta(r)(F_{ev} + F_b). \quad (8)$$

Notice that the electrostatic force is due to a field that is external to the fluid-particle system, as is the gravitational field, and therefore the work done by both fields is treated in a similar manner. In this analysis, we will ignore the work done by the electrostatic stress that acts on the two-fluid interface. In addition, this analysis of the behavior of two particles does not account for the multi body interactions (which could be accounted for by summing the forces exerted by all other particles on one given particle). Using equations (6) and (7), equation (8) can be rewritten as $$W_c = -\frac{(F_{ev} + F_b)^2}{2\pi\gamma} K_0(qr) = \\ -\left(-\varepsilon_0\varepsilon_a\left(\frac{\varepsilon_L}{\varepsilon_a} - 1\right)a^2 E^2 f_v + \frac{4}{3}\pi a^3 \rho_p g\ f_b\right)^2 \frac{1}{2\pi\gamma} K_0(qr) \quad (9)$$

Figure 19:
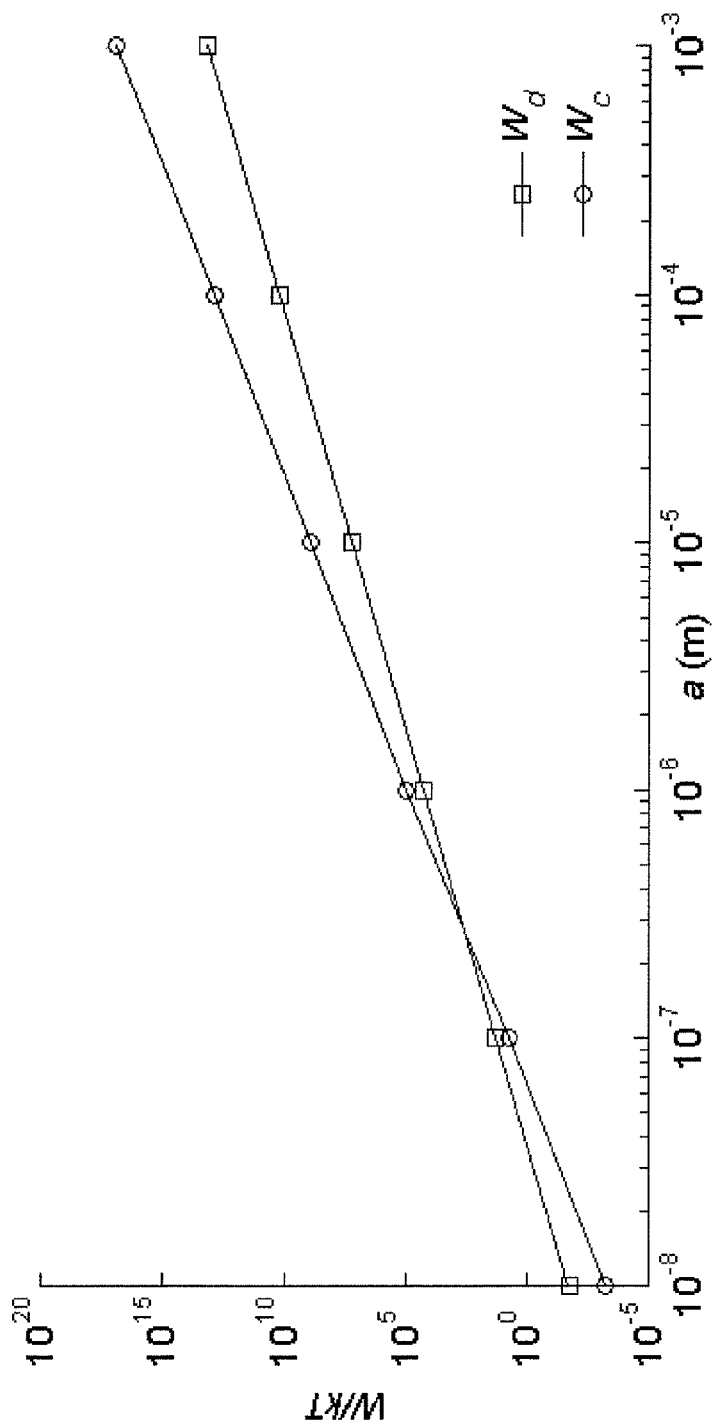
FIG. 19 illustrates energies of capillary attraction ($W_c$) and dipole-dipole repulsion ($W_d$).

FIG. 19 illustrates energies of capillary attraction ($W_c$) and dipole-dipole repulsion ($W_d$), in kT units, are plotted against the particle radius. For W/(kT)>1, the capillary attraction and the dipole-dipole repulsion are stronger than the Brownian force for all particles sizes down to a radius of approximately 100 nm. The parameters are $\varepsilon_a$=2.0, $\varepsilon_L$=4.0, E=3×10$^6$ volt/m, $f_v$=1, $f_p$=1, γ=0.01, $\rho_a$=1 kg/m$^3$, $\rho_L$=1000, $\rho_p$=3000 kg/m$^3$ and r=2a.

In FIG. 19, the interaction energy $W_c$ due to the lateral capillary force is plotted as a function of the particle radius. The parameter values are $\varepsilon_a$=2.0, $\varepsilon_L$=4.0, E=3×10$^6$ volt/m, $f_v$=1, γ=0.01, $\rho_a$=1 kg/m$^3$, $\rho_L$=1000, $\rho_p$=3000 kg/m$^3$ and r=2a. The figure shows that for these parameter values, the interaction energy (9) is significant for nano sized particles.

The lateral capillary force between two particles is therefore given by $$F_{lc} = -\frac{dW_c}{dr} = \left(-\varepsilon_0\varepsilon_a\left(\frac{\varepsilon_L}{\varepsilon_a} - 1\right)a^2 E^2 f_v + \frac{4}{3}\pi a^3 \rho_p g\ f_b\right)^2 \frac{qK_1(qr)}{2\pi\gamma} \quad (10)$$

where $K_1$(qr) is the modified Bessel function of first order. When the two particles are far away from each other, the above reduces to $$F_{lc} = -\left(\varepsilon_0\varepsilon_a\left(\frac{\varepsilon_L}{\varepsilon_a} - 1\right)a^2 E^2 f_v + \frac{4}{3}\pi a^3 \rho_p g\ f_b\right)^2 \frac{1}{2\pi\gamma r} \quad (11)$$

Notice that the lateral capillary force depends on the net vertical force acting on the particle, which includes its buoyant weight and the vertical electrostatic force. The force varies as the fourth power of the applied electric field, and if the electrostatic force and the buoyant weight are in the same direction, the electric field enhances the lateral capillary forces among the particles.

However, it is noteworthy that the vertical electrostatic force may not be in the same direction as the buoyant weight, and if this is the case there is a critical value of the electric field strength for which the net vertical force acting on the particle is zero. The lateral capillary force among the particles under these conditions would also be zero; this suggests that the electric field can be used to decrease, or even eliminate, capillarity induced attraction among the particles. If the electric field strength is increased further, the particles move upward in the interface and the capillary forces arise again but the interface near the particles would be curved downwards. Here we wish to note that the capillary force can cause particles to interact with each other only when the associated interaction energy is greater than kT, and therefore when the net external vertical force acting on the particles is small the latter are not likely to cluster as their motion would be governed by thermal fluctuations.

2.6 Spacing Between Particles

The dimensionless equilibrium separation $r_{eq}/(2a)$ between two particles can be obtained by equating the repulsive electrostatic force (3) and the above attractive capillary force (11). After simplification, we obtain $$\frac{r_{eq}}{2a} = \frac{1}{2}\left(\frac{2\pi\varepsilon_0\varepsilon_a\left(\frac{\varepsilon_L}{\varepsilon_a} + 1\right)\gamma E^2 f_D}{a\left(-\varepsilon_0\varepsilon_a\left(\frac{\varepsilon_L}{\varepsilon_a} - 1\right)E^2 f_v + \frac{4}{3}\pi a\rho_p g f_b\right)^2}\right)^{\frac{1}{3}} \quad (12)$$

This expression gives the dependence of $r_{eq}/(2a)$ on the parameters of the problem. However, we remind the reader that the dimensionless parameters, $f_D$, $f_D$ and $f_b$ themselves depend on several parameters (which is not reproduced in equation (12) for the sake of simplicity). Notice that $r_{eq}/(2a)$ decreases with increasing particle radius a.

FIG. 20 illustrates the dimensionless equilibrium separation between two particles plotted as a function of E for three values of the particle radius a. (a) a=10$^{-3}$ m, $r_{eq}/(2a)$ increases with increasing E. (b) a=1 μm, $r_{eq}/(2a)$ decreases with increasing E. (c) The buoyant weight and the vertical electrostatic force are in the same direction and a=4×10$^{-5}$ m. For E small, $r_{eq}/(2a)$ increases with increasing E, but for E large it decreases with increasing E. (d) The buoyant weight and the vertical electrostatic force are in the opposite directions and a=4×10$^{-5}$ m. For small values of E, $r_{eq}/(2a)$ increases with increasing E. There is a critical value of E for which the lateral capillary force is zero and thus particles only experience the repulsive electrostatic force and $r_{eq}/(2a)$ approaches infinity. For E large, $r_{eq}/(2a)$ decreases with increasing E.

Figure 20A:
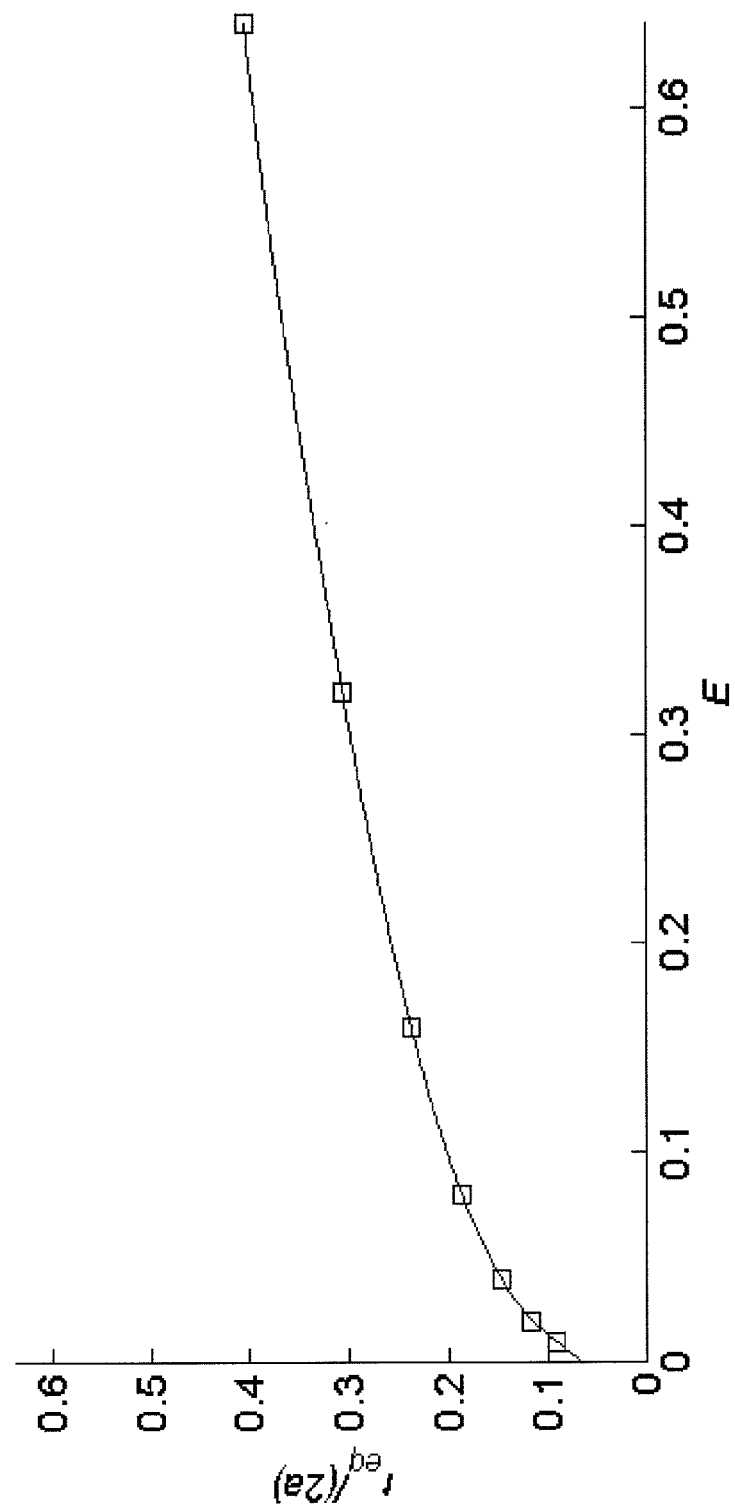

We now consider two limiting cases of the previous expression. The first is the case of relatively large particles for which the buoyant weight is much larger than the vertical electrostatic force. In this situation, equation (12) implies that $r_{eq}/(2a)$ increases with increasing electric field strength as $E^{2/3}$. This is approximately the case for a=10$^{-3}$ m, as shown in FIG. 20a. These conclusions are in agreement with the experimental data reported in N. Aubry, P. Singh, M. Janjua & S. Nudurupati, "Micro- and nano-particles self-assembly for virtually defect-free, adjustable monolayers", *Proceedings of the National Academy of Sciences*, 105, No. 10, 3711-3714 (2008) for particles with r=~10$^{-3}$ m. The attractive capillary forces for such particles primarily originate in the interfacial deformation due to their buoyant weight, and the repulsive force is due to the dipole-dipole interaction between them.

Figure 20B:
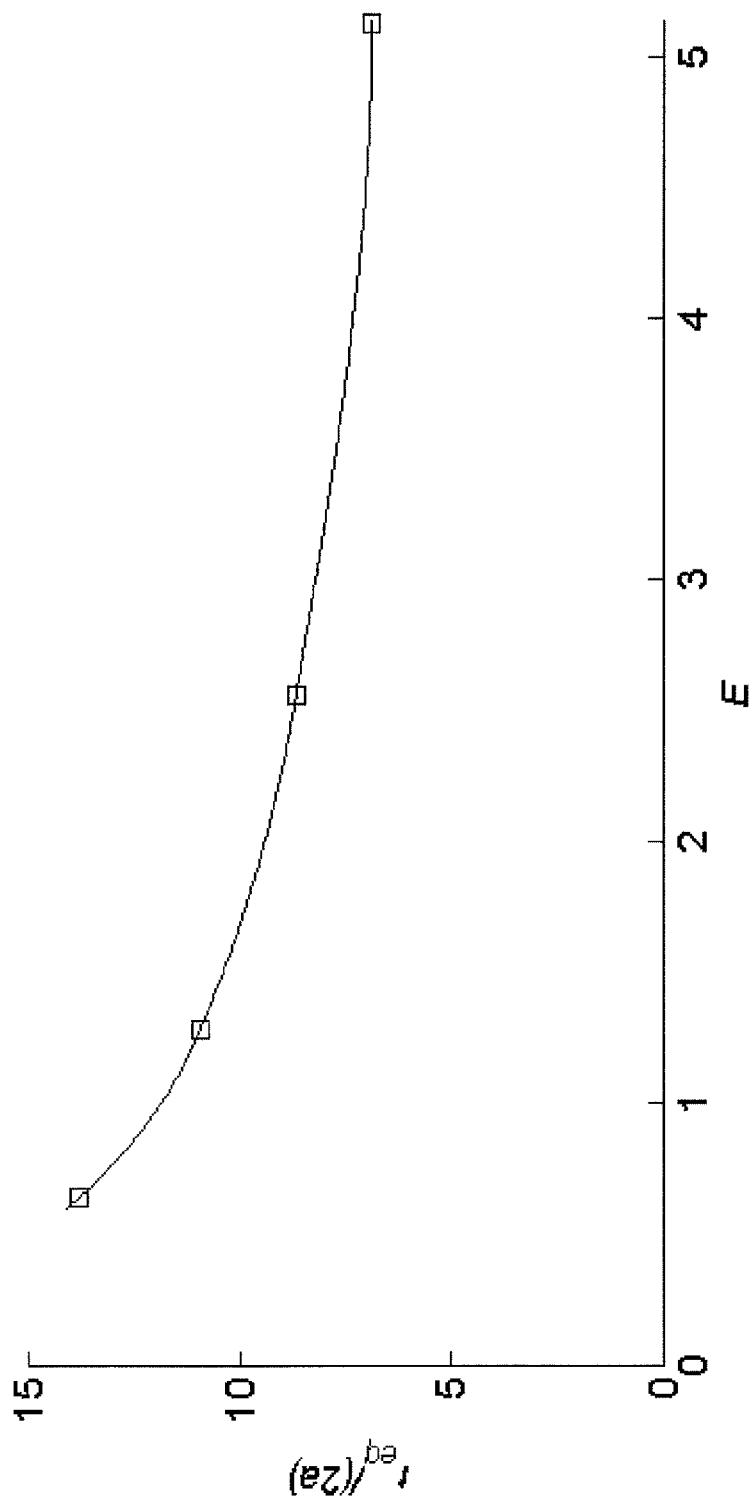
Figure 20C:
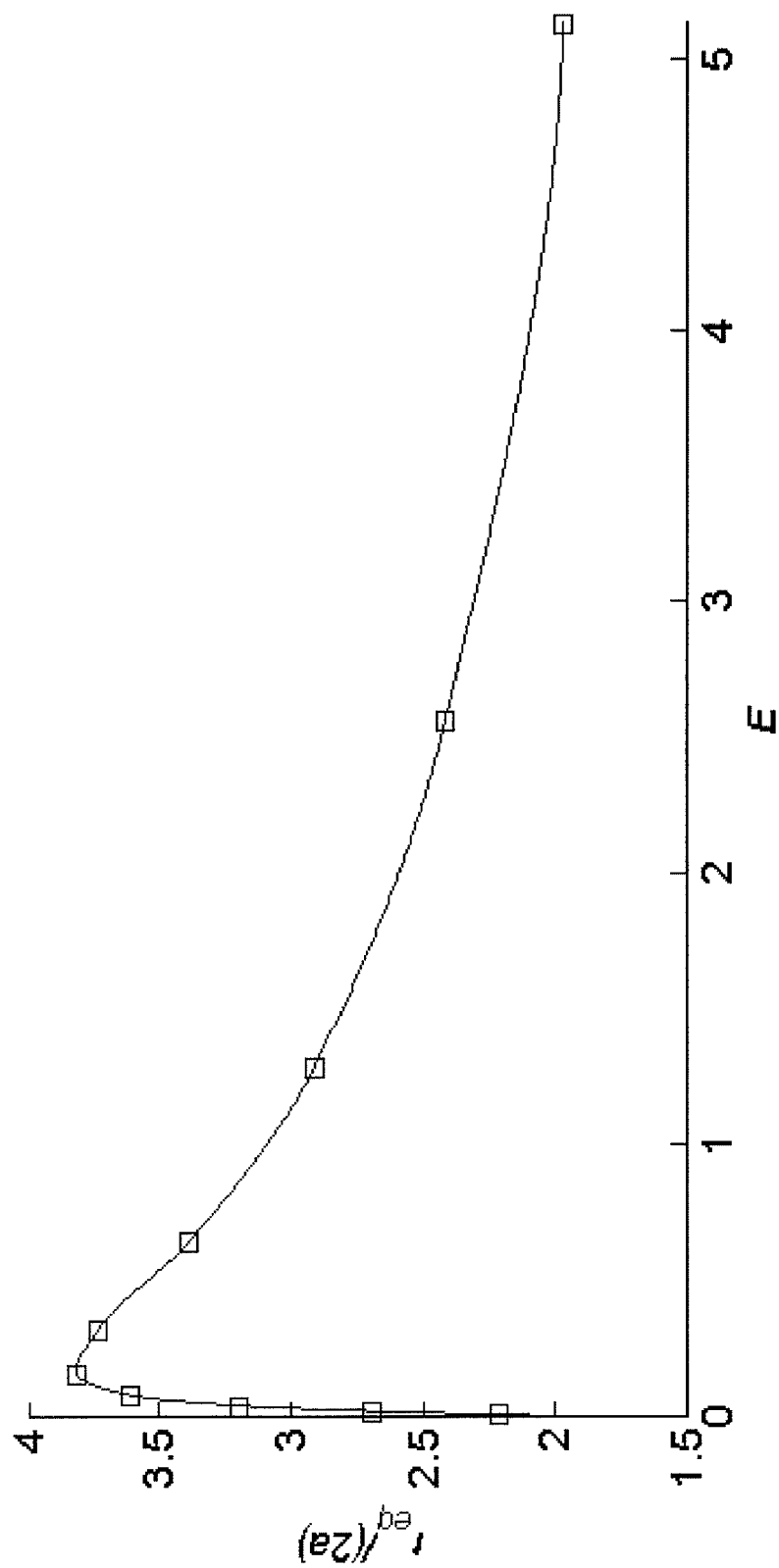

The second limiting case is that of relatively small sized particles for which the buoyant weight is negligible compared to the vertical electrostatic force. From equation (12), after the buoyant weight is neglected, we obtain that $r_{eq}/(2a)$ decreases increasing electric field strength as $E^{-2/3}$. As shown in FIG. 20b, this limiting case is approximately reached for a=1 μm. Both attractive and repulsive forces in this case are due to the applied electric field (since the buoyant weight is negligible). The attractive part varies as the fourth power of the electric field, but is long ranged (varies as $r^{-1}$). The repulsive part, on the other hand, varies as the square of the electric field, but is short ranged (varies as $r^{-4}$).

Here we wish to distinguish the above result with the model presented in M. G. Nikolaides, A. R. Bausch, M. F. Hsu, A. D. Dinsmore, M. P. Brenner, C. Gay and D. A. Weiz. "Electric filed induced capillary attraction between like-charged particles at liquid interfaces", *Nature* 420, 299-301 (2002), to explain the observation that small charged particles within an interface between water and a nonpolar liquid, such as air or oil, form periodic arrangements. They showed that in addition to interacting electrostatically with each other, the charged particles experience lateral capillary forces that arise because of the deformation of the interface (also see L. Foret and A. Wurger. "Electric field induced capillary interaction of charged particles in polar interfaces", *Phys. Rev. Lett.* 92, 058302-1 (2004); R. Aveyard, B. P. Binks, J. H. Clint, P. D. I. Fletcher, T. S. Horozov, B. Neumann, V. N. Paunov, J. Annesley, S. W. Botchway, D. Nees, A. W. Parker, A. D. Ward and A. N. Burgess. "Measurement of long-range repulsive forces between charged particles at an oil-water interface", *Phys. Rev. Lett.* 88, 246102-1 (2002); and K. D. Danov and P. A. Kralchevky, "Electric forces induced by a charged colloid particle attached to the water-nonpolar fluid interface", *Journal of Colloid and Interfaces Science* 298, 213-231 (2006)). The interfacial deformation in their experiments was due to a vertical electrostatic force that acts on the particle within the interface because of its charge and not due to the particle's weight (which is negligible). No external electric field was applied in their experiments, whereas for the invention described herein an external electric field is applied.

In the intermediate range between the two previous limiting cases, the attractive capillary force is a result of the net vertical force acting on the particles, which includes both the buoyant weight and the vertical electrostatic force. In an actual physical system, this intermediate range corresponds to particle radii between ~10 and ~100 μm. We now consider first the case in which the electrostatic force and the buoyant weight are in the same direction. The latter dominates when the electric field strength is small, and therefore, the distance between the particles increases with increasing electric field (see FIG. 20c). However, as the electric field strength is increased to a level where the vertical electrostatic force is much larger than the buoyant weight, the distance between the particles decreases with increasing electric field strength. Here, it is important to note that this result can be observed in experiments only if the electrostatic and capillary forces are larger than the Brownian forces. Furthermore, the former forces cannot be observed if they do not cause an observable deterministic motion. This may be the case if the distance between the particles is too large.

Figure 20D:
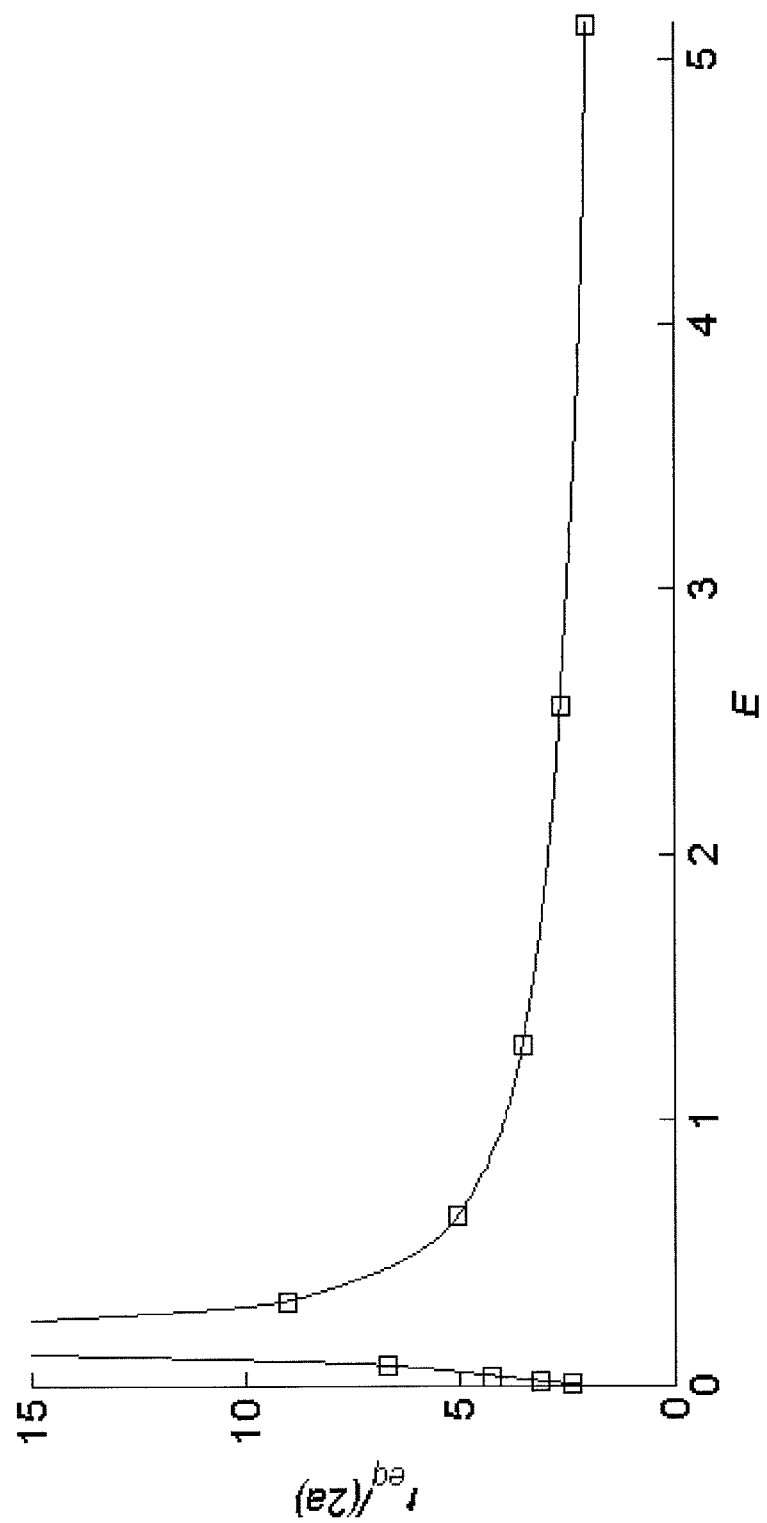

We next consider the case in which the electrostatic force and the buoyant weight are not in the same direction. In this case, there is a critical value of the electric field strength at which the lateral capillary force is zero. This corresponds to the situation where the sum of the buoyant weight and the vertical electrostatic force on the particle is zero. As a result, as shown in FIG. 20d, $r_{eq}/(2a)$ approaches infinity because the only lateral force the particles experience is the repulsive electrostatic force. However, since the repulsive electrostatic force decays as the fourth power of the distance between the particles, in experiments, the particles are expected to move only to a distance at which the associated interaction energy becomes comparable to kT. Another interesting feature of the curve in FIG. 20d is that a further increase of the electric field strength causes the lateral capillary forces to increase (since the sum of the buoyant weight and the vertical electrostatic force on the particle is again non zero) and $r_{eq}/(2a)$ to decrease.

3.0 Discussion and Conclusions

In view of explaining in detail the clustering of particles, we have studied the electrostatic and capillary forces acting on a particle within a two-fluid interface in the presence of both an externally applied electric field and other particles. Specifically, we have determined the dependence of the electrostatic force upon the dielectric properties of the fluids and the particles, as well as the position of the particle within the interface. It was assumed that the particles and the two fluids involved are perfect dielectrics, and that the particles are spherical. These assumptions, however, are not necessary for the technique to work. The electrostatic force was found to contain components both normal and tangential to the interface. The former arises because the dielectric constants of the two fluids involved are different (and is thus zero for two fluids of identical dielectric constants) and the latter is due to the dipole-dipole interactions among the particles. The component of the electrostatic force normal to the interface is shown to vary as the square of the particle radius, $a^2$. For sufficiently large distances between the particles, the lateral electrostatic force between two particles varies as $a^6$ and decreases with increasing distance between the particles as $r^{-4}$. We have also shown that when E~3×10$^6$ volt/m, the electrostatic forces can be used to manipulate the distance between nano sized particles floating at a two-fluid interface. Expressions of the various forces involved, as well as the equilibrium distance between the particles were given in N. Aubry, P. Singh, M. Janjua & S. Nudurupati, "Micro- and nano-particles self-assembly for defect-free, adjustable monolayers", *Proceedings of the National Academy of Sciences*, 105, 3711-3714 (2008).

The normal component of the electrostatic force, including its sign, depends on the dielectric constants of the fluids and particles. The equilibrium particle position $\theta_c$ of a particle within the interface is determined by the balance of the buoyant weight, the vertical interfacial force and the vertical electrostatic force. For small spherical particles, in the absence of an electric field the particle's position is primarily determined by the contact angle since the buoyant weight is negligible. Our numerical results show that when the dielectric constant of the upper fluid is smaller than that of the lower fluid and the particle's center is above the undeformed interface (this is the case for a small particle which is non-wetting with the lower liquid), the electrostatic force is in the upward direction. If, on the other hand, the particle center is below the undeformed interface (this is the case for a small particle which wets the lower liquid), there is a critical value of $\theta_c$ at which the electrostatic force changes direction. The critical value of $\theta_c$ depends on the dielectric constants of the fluids and the particle. Therefore, in the presence of an externally applied electric field, the interface acts like a barrier to the particles: the electrostatic force pushes the particles below the interface downwards and those above the interface upwards. The overall tendency of the electric force, however, is to push particles into the fluid region whose dielectric constant is smaller, but this can occur only if the particles have sufficient energy to cross the electric interface barrier.

In equilibrium, the net vertical force acting on a particle at the interface, which includes the electrostatic force and the buoyant weight, is balanced by the vertical capillary force which arises because of the deformation of the interface. The deformation of the interface, in turn, gives rise to lateral capillary forces which cause particles at the interface to cluster. More specifically, it is shown that the magnitude of these lateral forces is determined by the square of the net vertical force acting on the particle which includes both the buoyant weight and the vertical electrostatic force. The lateral capillary forces are long ranged and depend on the fourth power of the electric field intensity.

The buoyant weight and the vertical electrostatic force, however, may not be in the same direction, and when this is the case the electric field, in fact, reduces lateral capillary forces. If the electrostatic force and buoyant weight are in the same direction, the electric field enhances lateral capillary forces. This is an important result, especially for micron and sub micron sized particles for which the buoyant weight is negligible, because it shows that the clustering behavior of particles, including that of small particles, can be controlled using an externally applied electric field.

The equilibrium distance between two particles was obtained by equating the attractive capillary and repulsive electrostatic forces. Equilibrium is possible because the attractive capillary force between the particles is long ranged (decays as $r^{-1}$) and dominates the electrostatic repulsive force which is short ranged (decays as $r^{-4}$) when the distance between the particles is large. The opposite is true when the distance between the particles is small. The equilibrium distance was shown to depend on the particle radius, the electric field intensity, the buoyant weight, the particle's position within the interface and the dielectric constants. These results are in agreement with the recent experiments reported in N. Aubry, P. Singh, M. Janjua & S. Nudurupati, "Micro- and nano-particles self-assembly for defect-free, adjustable monolayers", *Proceedings of the National Academy of Sciences*, 105, 3711-3714 (2008), which show that the equilibrium distance between particles can be controlled by adjusting the electric field strength (see FIG. 10).

Figure 21:
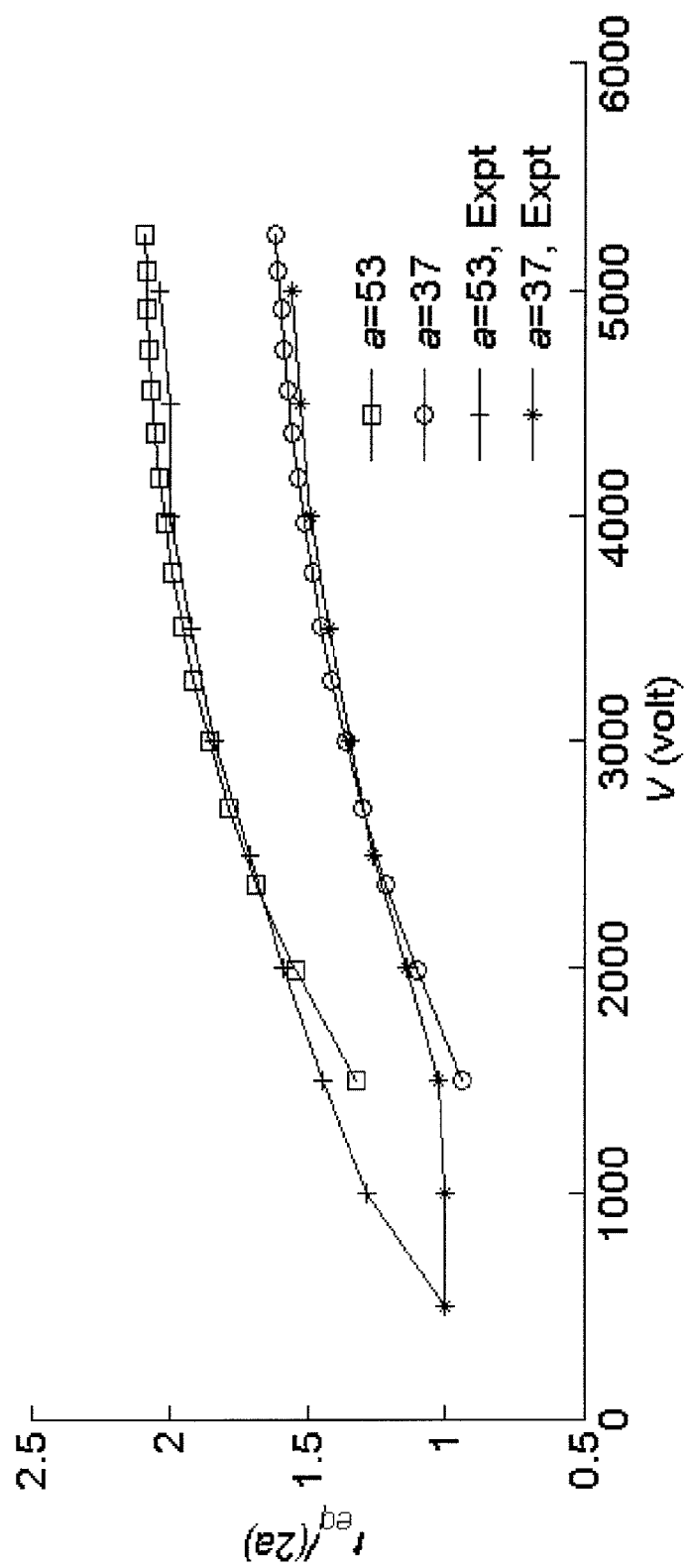
FIG. 21 illustrates the equilibrium separation $r_{eq}/(2a)$ between two particles for a=37 and 53 µm as given by equation (12) and the actual measured values (denoted by Expt) are shown as functions of the voltage applied.

FIG. 21 illustrates the equilibrium separation $r_{eq}/(2a)$ between two particles for a=37 and 53 μm as given by equation (12) and the actual measured values (denoted by Expt) are shown as functions of the voltage applied to the device described in FIG. 12. The electric force coefficients were numerically estimated to be $f_v$=0.27, $f_D$=0.019, and $f_b$=0.64. From the experimental photographs, we estimated $\theta_c$=76.5 degrees for the particles with a=37 μm, and this value was used for both cases. The agreement between the theory and the experimental data is very good, especially when the distance between the particles is more than 2.5a, considering that there are no adjustable parameters.

The theoretical results presented here correctly capture the trends observed in experiments. For example, the variation of the dimensionless equilibrium distance $r_{eq}/(2a)$ between two particles with the electric field strength, and also with the particle radius is predicted correctly as shown in FIG. 21. The figure displays $r_{eq}/(2a)$ given by equation (12), along with the actual measured values, as functions of the voltage applied to the device described in N. Aubry, P. Singh, M. Janjua & S. Nudurupati, "Micro- and nano-particles self-assembly for defect-free, adjustable monolayers", *Proceedings of the National Academy of Sciences*, 105, 3711-3714 (2008). The data is presented for a=37 and 53 μm. The distance between two particles increases with increasing electric field and with decreasing particle radius. From equation (12) we know that in the limiting cases the dimensionless distance between two particles varies as $E^\beta$. For relatively large sized particles (a>~1000 μm), for which the buoyant weight dominates, $\beta=\frac{2}{3}$, and for submicron sized particles, $\beta=-\frac{2}{3}$. For the data presented in FIG. 21, the distance between the particles increases with increasing E. According to equation (12), for submicron sized particles the distance between two particles should decrease with increasing electric field strength. At present, such experimental data for micron and submicron sized particles is not available, and therefore we are unable to verify the predictions of our theory for this size range. This reversal in the particle separation with increasing electric field strength, as noted before, is a consequence of the fact that the attractive capillary force is not a result of the particles' buoyant weight, but instead arises from the vertical electric force acting on the particles. To get small particles to cluster one may thus have to increase the electric field intensity.

Although the present invention has been described in terms of specific embodiments, many variations are possible.

Figure 22:
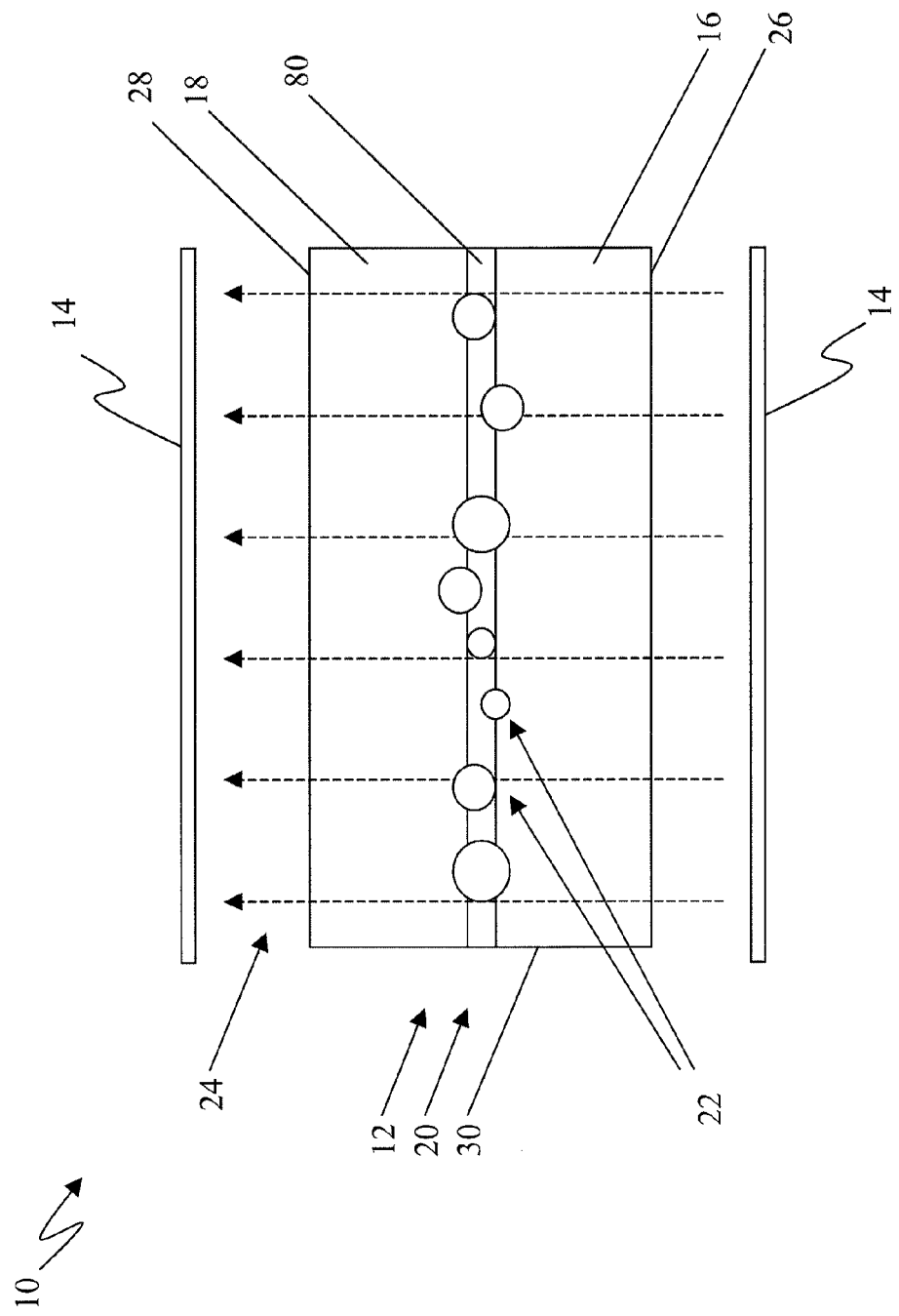
FIG. 22 illustrates an embodiment of the present invention in which a film is placed in between two fluids and the particles are located either at the interface between the top fluid and the film, or at the interface between the bottom fluid and the film, or at the two interfaces.

FIG. 22 illustrates an embodiment of the present invention in which the interface 20 between the fluids 16, 18 includes a film of a third fluid 80. In that embodiment, the film 80 has a thickness that is smaller than the diameter of some of the particles 22. However, in other embodiments, the film 80 may be thicker or comparable to the diameter of the particles 22. In some embodiments, the particles 22 are homogeneous and have the same characteristics, and in other embodiments, they are not homogeneous and/or have different characteristics. In such embodiments, for example, some of the particles 22 may have a diameter greater than the thickness of the film 80 and other particles 22 may have a diameter the same as or less than the thickness of the film 80. Similarly, all particles 22 may not float at the same height relative to the film 80, so that some particles 22 may be entirely within the film 80, some particles 22 may extend below the film 80, and some particles 22 may extend above the film 80.

In the illustrated embodiment 22, the third fluid 80 is placed between the fluids 16, 18. The illustrated embodiment has an interface between fluids 16 and 80, and an interface between fluids 18, and 80. It is possible with the illustrated embodiment to operate as a two interface system with particles 22 at both interfaces (e.g., particles 22 at the interface between fluids 16 and 80, and particles 22 at the interface between fluids 18 and 80). The manner in which the system operates will depend on factors such as the thickness of the fluid 80, and the characteristics of the particles 22 and the fluids 16, 18, 80.

For example, if the thickness of the fluid 80 is small compared to the diameter of the particles 22, then the system may be more conveniently viewed as having one interface (e.g., the film 80 is sufficiently thin and the particles sufficiently large that the interface between fluids 16 and 80 and the interface between fluids 18 and 80 are treated as only one interface). In that case, for example, large particles 22 floating at the interface between fluids 16 and 80 will interfere with the movement of large particles 22 floating at the interface of fluids 80 and 18. Also, large particles 22 will float so that they are both at the interface between fluids 16 and 80, and at the interface between fluids 18 and 80. Thus, under these conditions particles 22 will experience capillary forces from both of these interfaces. However, if the thickness of the fluid 80 is large compared to the diameter of the particles 22, then the system may be more conveniently viewed as having two interfaces (one between fluids 16 and 80, and a second between fluids 80 and 18). In that case, for example, small particles 22 floating at one interface may move freely within their interface without interfering with particles 22 floating and moving at the other interface. As used herein, "interface" can mean the place where two fluids meet, or "interface" can mean two or more interfaces treated as a single interface, such as a thin fluid or film 80 between two other fluids 16, 18.

Although the fluid 80 between the first and second fluids 16, 18 is often referred to as a "film", the use of the term "film" is not intended to limit the thickness of the fluid 80. Furthermore, although the third fluid/film 80 will generally be illustrated as having a thickness significantly less than that of the first and second fluids 16, 18, the third fluid 80 is not limited to having a thickness that is significantly less than that of the first and second fluids 16, 18.

Figure 23:
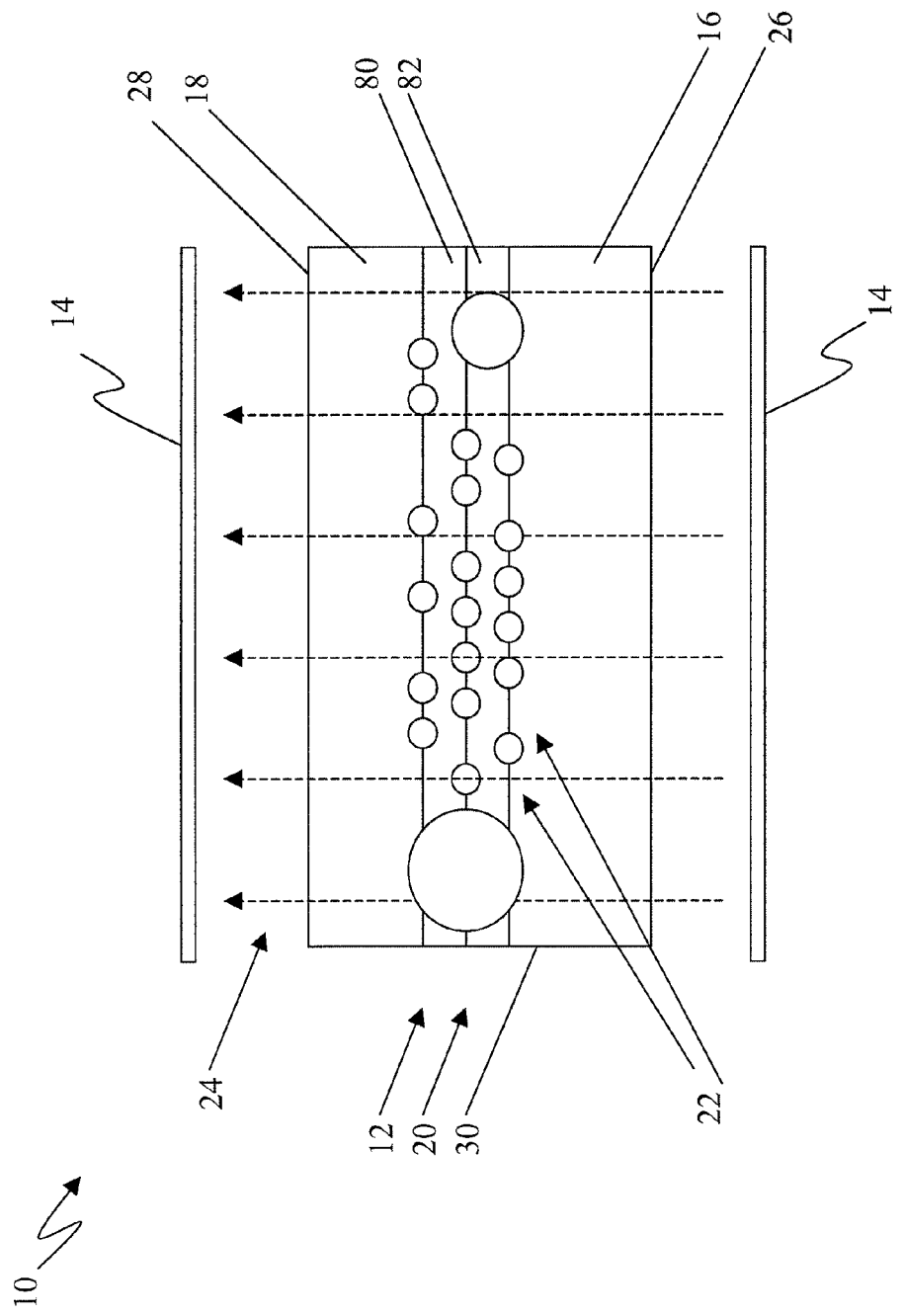
FIG. 23 illustrates an embodiment of the present invention including more than one film between the fluids.

FIG. 23 illustrates another embodiment of the present invention including two fluid layers or films 80, 82 between the first and second fluids 16, 18. In other embodiments, the present invention may include additional fluids or films between the first and second fluids 16, 18. This system may be considered to have two interfaces 20 formed by the two additional fluids or films 80, 82. However, the system may also be viewed as having three interfaces where the fluids meet (e.g., between 16 and 18, between 80 and 82, and between 82 and 18). The particles 22 may be located at one or more than one of the various interfaces. For example, particles 22 may be located at each of the interfaces between the fluids 16, 18, 80, 82, or at only some of the interfaces. In this case, capillary forces involving the multiple interfaces will act on the particles located at such interfaces.

Many variations are possible with the present invention. For example, in other embodiments, some of the interfaces 20 may not include particles 22. In addition, each of the fluids 16, 18, 80, 82 may be a different material, or the same material may be used for more than one fluid layer (such as in the case where two or more fluid materials are alternated to form the various layers of fluids 16, 18, 80, 82). Similarly, all of the fluids 16, 18, 80, 82 may have the same thickness, or they may have different thicknesses. For example, in the illustrated embodiment, the upper film 80 may have a greater thickness than the lower film 82, although this is not required in the present invention. As described above, the particles 22 may be homogeneous or they may have different characteristics, and the characteristics of the particles may be the same in each of the different films 20, or the characteristics of the particles 22 in one film may be different from those in other films 20. Other variations are possible.

Although the present invention has been described in terms of specific embodiments and implementations, the present invention is applicable to other methods, apparatuses, systems, and technologies. The examples provided herein are illustrative and not limiting, and other variations and modifications of the present invention are contemplated. Other variations and modifications of the present invention are possible and contemplated, and it is intended that the foregoing specification and the following claims cover such modifications and variations.

The invention claimed is:

1. A method of changing the relative position of a plurality of particles at an interface between a first and a second fluid, wherein the first and second fluids are different fluids, comprising:
    applying an electric field perpendicular to the interface;
    moving the particles vertically in the interface in response to applying the electric field;
    moving the particles laterally within the interface in response to the electric field and capillary forces;
    maintaining the particles at the interface when moving the particles vertically; and
    maintaining the particles at the interface when moving the particles laterally.

2. The method of claim 1, further comprising deforming the interface around the particles, wherein the capillary forces arise because of the deformation of the interface.

3. The method of claim 1, wherein the interface includes a film of a third fluid placed in between the first and second fluids.

4. The method of claim 3, wherein:
    the particles have a diameter; and
    the third fluid has a thickness that is less than the diameter of the particles.

5. The method of claim 4, wherein at least one of the particles is in contact with both an interface between the first and third fluids and an interface between the second and third fluids.

6. The method of claim 3, wherein moving the particles laterally include moving the particles at an interface between the first fluid and the film.

7. The method of claim 6, wherein moving the particles laterally includes:
    moving a first plurality of particles at an interface where the first fluid and the film contact each other; and
    moving a second plurality of particles at an interface where the second fluid and the film contact each other, wherein the first plurality of particles do not touch the second plurality of particles during the step of moving the particles laterally.

8. The method of claim 1, further including at least two additional fluids between the first and second fluids.

9. The method of claim 1, wherein the electric field has an intensity and, prior to applying the electric field, further comprising:
    sensing a characteristic of the particles; and
    determining whether the characteristic of the particles satisfies a predetermined condition.

10. The method of claim 9, wherein applying the electric field includes applying the electric field if the characteristic of the particles does not satisfy the predetermined condition.

11. The method of claim 10, wherein after moving the particles laterally, further comprising:
    sensing a characteristic of the particles; and
    changing the intensity of the electric field in response to sensing the characteristic of the particles.

12. The method of claim 11, wherein changing the intensity of the electric field in response to sensing the characteristic of the particles includes:
- comparing the characteristic of the particles to a predetermined condition; and
- changing the intensity of the electric field if the characteristic of the particles does not satisfy the predetermined condition.

13. The method of claim 1, wherein moving the particles laterally within the interface includes increasing a distance between the particles.

14. The method of claim 1, wherein moving the particles laterally within the interface includes decreasing a distance between the particles.

15. The method of claim 1, wherein the electric field has an intensity and, after moving the particles laterally, further comprising:
- sensing a characteristic of the particles; and
- changing the intensity of the electric field in response to sensing the characteristic of the particles.

16. The method of claim 15, wherein changing the intensity of the electric field in response to sensing the characteristic of the particles includes:
- comparing the characteristic of the particles to a predetermined condition; and
- changing the intensity of the electric field if the characteristic of the particles does not satisfy the predetermined condition.

17. The method of claim 1, further comprising polarizing the particles.

18. The method of claim 1, wherein the electric field has an intensity, and wherein:
- applying the electric field includes increasing the intensity of the electric field at the interface; and
- moving the particles laterally includes increasing a distance separating the plurality of particles.

19. The method of claim 1, wherein the electric field has an intensity, and wherein:
- applying the electric field includes increasing the intensity of the electric field at the interface; and
- moving the particles laterally includes decreasing a distance separating the plurality of particles.

20. The method of claim 1, wherein the electric field has an intensity, and wherein:
- applying the electric field includes decreasing the intensity of the electric field at the interface; and
- moving the particles laterally includes increasing a distance separating the plurality of particles.

21. The method of claim 1, wherein the electric field has an intensity, and wherein:
- applying the electric field includes decreasing the intensity of the electric field at the interface; and
- moving the particles laterally includes decreasing a distance separating the plurality of particles.

22. The method of claim 1, wherein the first and second fluids are a liquid and a gas.

23. The method of claim 1, wherein the first and second fluids are both liquids.

24. A method of orienting a plurality of particles in a monolayer array, wherein the plurality of particles are located at an interface between first and second different fluids, comprising:
- increasing an intensity of an electric field perpendicular to the interface;
- increasing a distance between the plurality of particles in response to increasing the electric field perpendicular to the interface;
- maintaining the increased distance between the plurality of particles;
- allowing the plurality of particles to change their orientation after increasing the distance between the plurality of particles;
- reducing the intensity of the electric field perpendicular to the interface; and
- decreasing the distance between the plurality of particles in response to decreasing the intensity of the electric field perpendicular to the interface.

25. The method of claim 1, wherein the relative position of the plurality of particles is changed by:
- increasing an intensity of an electric field perpendicular to the interface;
- increasing a distance between the plurality of particles in response to increasing the electric field perpendicular to the interface;
- maintaining the increased distance between the plurality of particles;
- allowing the plurality of particles to change their orientation after increasing the distance between the plurality of particles;
- reducing the intensity of the electric field perpendicular to the interface; and
- decreasing the distance between the plurality of particles in response to decreasing the intensity of the electric field perpendicular to the interface.

* * * * *

UNITED STATES PATENT AND TRADEMARK OFFICE
CERTIFICATE OF CORRECTION

PATENT NO. : 8,049,183 B1  
APPLICATION NO. : 12/267332  
DATED : November 1, 2011  
INVENTOR(S) : Nadine N. Aubry et al.

Page 1 of 1

It is certified that error appears in the above-identified patent and that said Letters Patent is hereby corrected as shown below:

ON THE TITLE PAGE:

Column 1, Item (73) Assignee, add the following:
-- New Jersey Institute of Technology, Newark, NJ (US) --

Signed and Sealed this
Sixteenth Day of October, 2012

David J. Kappos
*Director of the United States Patent and Trademark Office*